US012626174B2

(12) United States Patent
Palmer et al.

(10) Patent No.: US 12,626,174 B2
(45) Date of Patent: May 12, 2026

(54) METHOD OF DRIVING A QUANTUM COMPUTER TO FIND ONE OR MORE STATES OF INTEREST OF A NETWORK

(71) Applicant: MULTIVERSE COMPUTING SL, Donostia (ES)

(72) Inventors: Samuel Douglas Palmer, Toronto (CA); Pablo Martin, Donostia-San Sebastian (ES); Samuel Mugel, Toronto (CA); Roman Oscar Orús, Donostia-San Sebastian (ES)

(73) Assignee: MULTIVERSE COMPUTING SL, Donostia (ES)

( * ) Notice: Subject to any disclaimer, the term of this patent is extended or adjusted under 35 U.S.C. 154(b) by 1143 days.

(21) Appl. No.: 17/562,124

(22) Filed: Dec. 27, 2021

(65) Prior Publication Data

US 2023/0289641 A1 Sep. 14, 2023

(30) Foreign Application Priority Data

Dec. 21, 2021 (EP) ..................................... 21383186

(51) Int. Cl.
 *H04L 41/14* (2022.01)
 *G06N 10/40* (2022.01)
(52) U.S. Cl.
 CPC ..................................... *G06N 10/40* (2022.01)
(58) Field of Classification Search
 CPC .............................. H04L 41/145; G06N 10/40
 See application file for complete search history.

(56) References Cited

U.S. PATENT DOCUMENTS

| | | | | |
|---|---|---|---|---|
| 10,282,280 B1 * | 5/2019 | Gouskova | ............... | A63F 13/35 |
| 10,307,662 B1 * | 6/2019 | Cantwell | ................... | A63F 3/02 |
| 2017/0329844 A1 * | 11/2017 | Tacchi | ................ | G06F 16/9024 |

OTHER PUBLICATIONS

Joel C. Miller, "Math 220 H Notes—Matrices", published latest on May 21, 2013 to https://scholar.harvard.edu/files/joelmiller/files/s2013_m220h.pdf, retrieved Jun. 21, 2025. (Year: 2013).*

(Continued)

*Primary Examiner* — Shourjo Dasgupta
(74) *Attorney, Agent, or Firm* — Perilla Knox & Hildebrandt LLP; Jason M. Perilla

(57) ABSTRACT

There is presented a method of driving a quantum computer to find one or more states of interest of a network. In one example, the network comprising a plurality of players. The method determines a set of adjacent graphs by determining, for each graph, whether each of the other graphs are adjacent. The method defines a cost function associated with a Hamiltonian operator of the quantum computer; the cost function comprising a set of parameters determined by analysing the utilities of vertices in the set of adjacent graphs. The method further comprises outputting a plurality of control signals for driving the quantum computer wherein the control signals are associated with the set of parameters and comprise: one or more control signals for controlling the states of qubits in the quantum computer; and, one or more control signals for controlling the entanglement of qubits in the quantum computer.

19 Claims, 7 Drawing Sheets

(56)        References Cited

OTHER PUBLICATIONS

Mathematics Stack Exchange, "Creating all strongly connected graphs with given indegree with equal probability", answer portion by Brent Kerby specifically provided on Feb. 24, 2015 to the URL noted by Examiner via annotation, retrieved Jun. 21, 2025. (Year: 2015).*

Kevin C. Young, etc., "Adiabatic quantum optimization with the wrong Hamiltonian", published on Oct. 2, 2013 to arXiv, retrieved Jun. 21, 2025. (Year: 2013).*

European Search Report for European Application No. 21383186.0 mailed Jun. 15, 2022.

Roch Christoph et al: "A Quantum Annealing Algorithm for Finding Pure Nash Equilibria in Graphical Games", Aug. 20, 2020 (Aug. 20, 2020), pp. 1-14, XP055927707, arXiv.org Retrieved from the Internet: URL:https://arxiv.org/pdf/1903.06454.pdf [retrieved on Jun. 2, 2022].

Anonymous: "Constraints Example: Minor-Embedding-", Nov. 10, 2021 (2021-11-10), pp. 1-5, XP055927772, D-Wave System Documentation documentation Retrieved from the Internet: URL:https://web.archive.org/web/20211110130455/https://docs.dwavesys.com/docs/latest/c_gs_7.html [retrieved on 2022-06-03] * the whole document *.

* cited by examiner

1

METHOD OF DRIVING A QUANTUM COMPUTER TO FIND ONE OR MORE STATES OF INTEREST OF A NETWORK

FIELD OF THE INVENTION

The present invention is in the field of quantum computing, in particular, but not limited to, using a quantum annealer for finding a solution to a network problem.

BACKGROUND

The study of networks is a key area of study in many fields, and it is largely inspired by empirical findings of real-world networks such as social networks, biological networks, technological networks, financial networks, brain networks, climate networks and computer networks, among others. The formation and evolution of networks has been studied from a theoretical perspective throughout the literature. In particular, Jackson and Watts ("The evolution of Social and Economic Networks" Journal of Economic Theory, vol. 106, issue 2, October 2002) provided theoretical results in this field. Previously, stable configurations of a network have been attempted by using a Markov Chain Monte Carlo process. However, analysing the formation and evolution of these networks in practise is a very complex task, because the number of possible configurations in the network grows exponentially with the number of nodes and types of links. As a result, the computational resources that are needed to model the system also grow exponentially with the size of the network. For this reason, modelling the behaviour and assessing the robustness and stability of a network is an intractable task for classical computers for more than a few players.

SUMMARY

There is presented a method of driving a quantum computer to find one or more states of interest of a network, the quantum computer comprising a quantum system; the network comprising a plurality of players wherein: a set of different configurations for the network are represented by a set of graphs; each player is associated with a different vertex in a set of vertices; each of the one or more states of interest respectively corresponds to one of the graphs; each graph comprises: the plurality of players; and, a set of connections representing edges between the vertices, wherein: each connection connects two vertices; a different set of connections to any of the other graphs in the set of graphs; for each graph, a corresponding set of utilities defines a net payoff between the players having a connection in the respective graph. The method comprising using a processor to: I) determine a set of adjacent graphs by determining, for each graph, whether each of the other graphs are adjacent by: defining another graph to be adjacent if the connections between the two graphs differs by one; II) define a cost function associated with a Hamiltonian operator of the quantum computer; the cost function comprising a set of parameters determined by analysing the utilities of the vertices in the set of adjacent graphs wherein: a transition between adjacent graphs is determined as viable or nonviable wherein a viable transition occurs if: a connection is added between the vertices and: the utility of at least one of the said vertices is increased; and, the utility of the other of the said vertices is increased or remains the same; or, a connection is removed between the vertices and: the utility of one of the said vertices is increased; viable transitions between adjacent graphs increase the energy of the quantum system; non-viable transitions between adjacent graphs lower the energy of the quantum system. The method further comprising: outputting a plurality of control signals for driving the quantum computer; the control signals associated with the set of parameters and comprising: one or more control signals for controlling the states of qubits in the quantum computer; and, one or more control signals for controlling the entanglement of qubits in the quantum computer. The method may be adapted according to any step or feature described herein, including, but not limited to, any one or more of the following options listed in the summary.

In some circumstances, when the quantum computer is run using the control signals, a state of interest is not found.

A network may be any collection of two or more nodes that form a graph. In examples presented herein each node may represent a different player. A collection of different graphs with similar or the same internal nodes may form a supernetwork. The network may comprise a set of vertices and directed or undirected edges. These edges may be weighted or unweighted.

The method may be configured such that the step of determining a set of adjacent graphs comprises deterministically constructing adjacent graphs using the definition of adjacency in claim 1, and as such appropriately adding or removing an edge from a graph.

The method may be configured such that the determining of adjacent graphs is used to determine player information; the player information comprising: a set of numerical values for each player, each numerical value associated with one of a plurality of player states, each player state being a associated with a graph, $f(g, p)$; an adjacency between player states based on a graph adjacency.

There may a plurality of player states, that may be determined by any given player.

A player state may be a function of a particular graph. A player state may be the same for a plurality of graphs, but possibly not all graphs. Typically, each player is associated with a plurality of player states wherein at least one player state for one graph is different to the player state for another adjacent graph.

The information about transitions between adjacent player states may be stored in memory. The set of adjacencies (of adjacent graphs rather than adjacent player states) are thus inherently stored by storing the set of player state adjacencies because player state adjacencies may be deemed to be adjacent only if the graphs associated with the two player states are adjacent. For example, the same player 'A' in graphs 2 and 3 may have different states in each graph, furthermore the two graphs in this example are adjacent because they obey the rule/s for graph being adjacent.

The method may be configured such that the player information is stored in a binary matrix.

This binary matrix may be referred to as the sign matrix, where each row corresponds to a single player and each column corresponds to an adjacency between player states. Each element in a given row may indicate the value of transitioning between different player states within the set of adjacent graphs.

The set of adjacencies may be stored in an adjacency matrix, which may be the sign matrix.

The method may be configured such that the cost function comprises a quadratic unconstrained binary optimisation cost function, QUBO.

The method may be configured such that at least one of the parameters comprising a cost of making a transition between two adjacent graphs; wherein determining the cost of making a transition comprises: determining, for each of the players, the player state; determining, for each of the players between the two graphs, the change in utility; determining whether each change in utility is positive or negative.

The method may be configured such that determining whether each change in utility is positive or negative comprises: reading an entry from the sign matrix with respect to the player state; determine, from the read entry, that the transition between the two adjacent graphs is viable or non-viable.

This determination may be made using one or more network determination rules as described elsewhere herein.

The method may be configured such that reading the entry comprises matrix multiplying the sign matrix with canonical basis vectors.

The method may further comprise, for the two players associated with a viable transition: determining the player state column index and player state row index of the matrix for the respective read entry associated with that player.

The corresponding entry of the matrix may be read from memory directly by addressing the matrix entry with respect to the player state column index and player row index.

The method may be configured such that the canonical basis vectors are: predetermined; or, determined by mapping a player state to a canonical basis vector.

An incorrect mapping may result in an increase in the quantum system energy. The method with option b) may be adapted such that the set of parameters comprises a set of terms that increase the energy of the quantum system for incorrect vector mappings. The mappings may comprise of: mapping the numerical player state, $f(g, p)$, to a canonical basis vector.

The method may be configured such that the set of parameters comprises a set of terms that increase the energy of the quantum system for any one or more of the following: a transition associated with edge removal is beneficial for either player but the edge transition is determined as a non-viable transition; a transition associated with edge removal is not beneficial for either player but the edge transition is determined as a viable transition; a transition associated with edge addition is beneficial for both players but the edge transition is determined as a non-viable transition; a transition associated with edge addition is beneficial for either player but the edge transition is determined as a viable transition; a transition associated with edge addition is not beneficial for either player but the edge transition is determined as a viable transition.

The method may be configured such that the set of parameters comprises: a first set of terms which represent counts of the number of viable transitions from each graph to any other adjacent graph; wherein each of the terms in the set increases the energy of the quantum system when any of: i) a transition is 4determined as a viable edge addition, but the edge is being removed; ii) a transition is determined as a viable edge removal, but the edge is being added; a second set of terms which increase the energy of the quantum system for graph states with a predetermined number of viable transitions that is different from the one of the graph states of interest.

The method may be adapted such that any of the above determinations of parameters may be repeated iteratively for each adjacency for each graph. The method may further comprise any one or more of the following steps in each iteration:
a) assigning a value for each player based on determining whether each change in utility is positive or negative;

b) determining whether the adjacency corresponds to an edge being added or removed;
c) assigning a binary value corresponding to whether the transition is viable or not.
d) determining a term, for the set of second terms, that increases the energy of the quantum system based on previous step a) and b).

The method may be configured such that the QUBO is a first QUBO, the method further comprising determining cycles of states in a supernetwork by forming a second QUBO from summing terms in the first QUBO associated with increasing the quantum system energy according to a cycle topology.

The method may be adapted to also find states of interest when adding extra features to these states, which can comprise but are not limited to:
a. the states of interest that are found by the method being adjacent to each other;
b. The states of interest that are found by the method sharing the same transition.

These features may be included by introducing any additional sets of terms that increase the energy of the quantum system when:
a. If the states of interest to be found by the method are required to be adjacent to each other, extra terms may increase the energy of the quantum system for non-adjacent solutions.
b. If the states of interest to be found by the method are required to share the same transition, extra terms may increase the energy of the quantum system for solutions with one different transition.

A cycle topology can be defined as a sequence of adjacent graphs obeying a set of conditions with respect to viable transitions of the graphs. The condition may be any of:
i) in the sequence of graphs all the viable transition corresponds to an addition and removal of a set of edges;
ii) any one graph may be determined as a first graph of the sequence, the first graph is also the last graph of the sequence (thus the sequence may form a closed loop sequence of graphs).

For (i) above, each of the viable transitions that may be added are removed elsewhere in the cycle; and/or, each of the viable transitions that may be removed is added elsewhere in the cycle.

For condition (ii) above, there is a net zero change in edges between the first and last graph.

The finding of a cycle of states may be associated with energy contributions of the quantum system, wherein
a. the total system energy will be 0 when all required conditions for the cycle are met;
b. the total system energy will be greater than 0 when any one or more conditions are not met.

The system energy may be determined by the sets of cost terms 'Hs', 'PC' and 'PD', wherein the terms contribute the quantum system energy as follows:
'Hs' are the sets of cost terms described elsewhere herein.
'PC' are the sets of cost terms defined by the topology of adjacent graphs as specified by a sequence of graphs.
'PD' are the sets of cost terms defined by the topology of adjacent graphs and the sets of allowed viable transitions which may be determined by methods described herein The above methods may have computational and resource complexities scaling $O(N|\chi|)$ wherein N denotes the plurality of players from claim 1, and $|\chi|$ denotes the plurality of player states. The complexity scaling of $O(N|\chi|)$ may achieve, in possible cases, up to a super-exponential benefit when compared to previously known classical methods of computation.

The method may further comprise: populating a QUBO matrix with data associated with the set of parameters; deriving the control signals from the QUBO matrix. The quantum computer may comprise a quantum annealer.

The method may further comprise running the quantum computer using the control signals.

There is further presented an apparatus comprising a computer system for running the method as described herein. The apparatus may further comprise the quantum computer, wherein the quantum computer may comprise a quantum annealer.

BRIEF DESCRIPTION OF THE DRAWINGS

Embodiments of the present invention will now be described in detail with reference to the accompanying drawings, in which.

DETAILED DESCRIPTION

Figure 1:
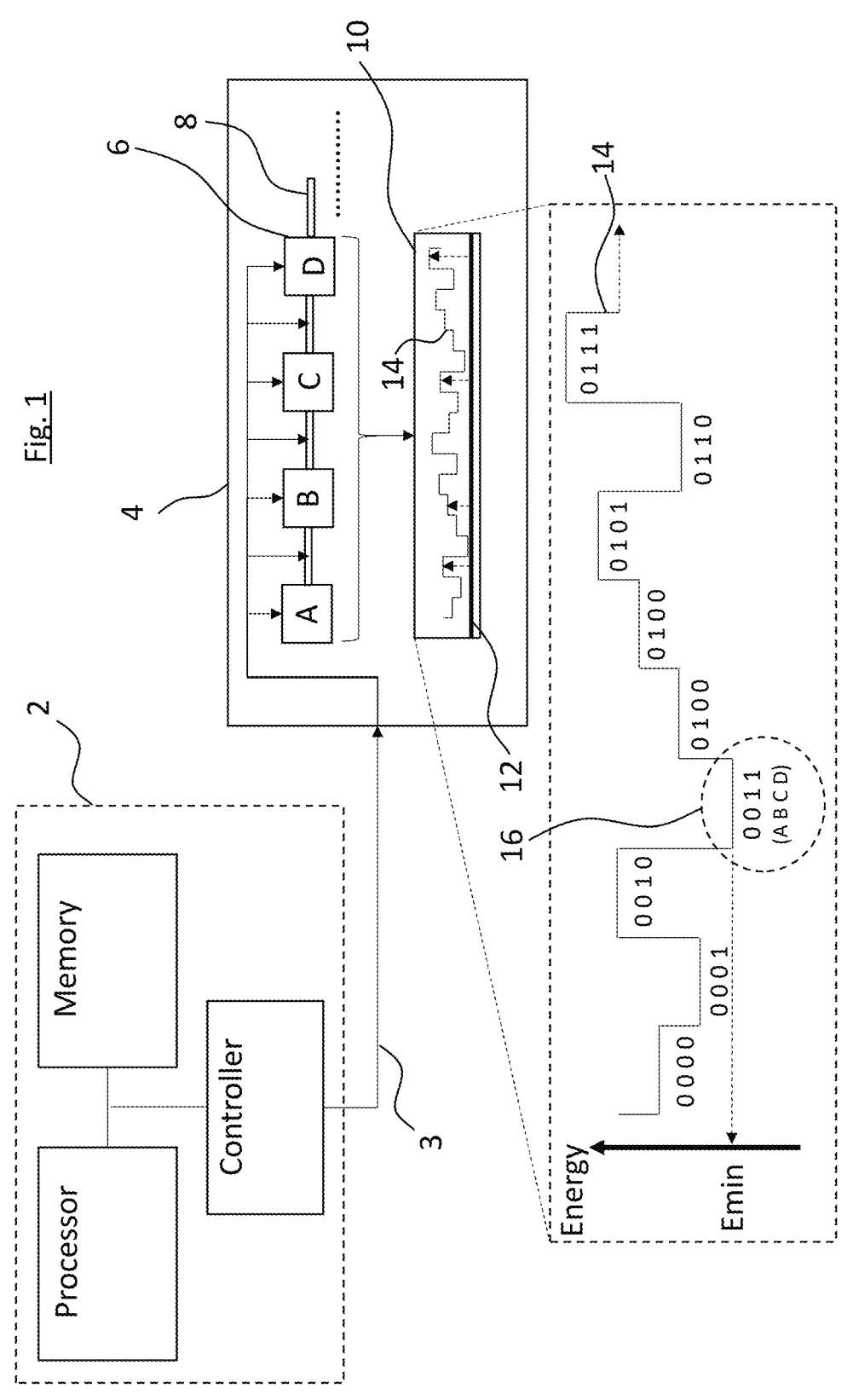
FIG. 1 shows a schematic example of apparatus for use with the method described herein.

The method, system and apparatus presented herein may be used to affect the operation of a quantum computer. More detailed examples of quantum computers used within or by the apparatus, or that the method can be applied to, are described elsewhere herein. Certain parts of the method may be performed by a classical computer. FIG. 1 shows a simplified example of a schematic of a quantum annealing set-up for use with the methods described. As such, the methods may be used to input control signals into a quantum annealer. Other quantum computers, including other adiabatic quantum computers, may be used instead of a set-up like FIG. 1. However, for purposes of describing the methods presented herein, a set-up similar to FIG. 1 is assumed to be used.

In FIG. 1, a classical electronic computer (2) comprising at least a memory, processor and controller, is used to generate one or more control signals (3) that are output by the controller to a quantum computer (4). The classical computer (2) may have other components such as, but not limited to, a user interface, display and other components listed elsewhere herein. The control signals (3) may be electrical signals or other signals such as optical signals. The quantum computer (4) in FIG. 1 comprises a quantum system, also referred to as a quantum processor, comprising two or more qubits (6) wherein at least two of the qubits (6) are able to be entangled. In FIG. 1 the entanglement is achieved via one or more couplers (8). FIG. 1 shows a schematic example wherein an array of qubits (6) are connected in series by a plurality of couplers, with one coupler (8) connecting two adjacent qubits (6). Four of the qubits, labelled 'A', 'B' 'M', 'D' are shown in FIG. 1 but it should be understood that the quantum system may comprise any number of qubits, for example 500, 1000, or 2000 or more wherein each qubit may be coupled, via a coupler (8), to one or a plurality of other qubits (6). The quantum computer (4) further comprises other components (not shown) to aid in the running of the quantum system. These other components may be: electrical, magnetic or optical components for inputting stimuli (such as voltage biases, magnetic fields or other stimuli) into the quantum system to control the qubits (6) and to control the couplers 8; measurement components for reading the classical states of the qubits (6) of the quantum system; other components such as electro-magnetic isolation equipment, sound dampening equipment and cryogenic equipment. The control signals (3) are used to determine at least some of the input stimuli into the quantum system.

The quantum system is driven by at least one control signal (3) to put the qubits (6) into a superposition state (12) which is shown on the energy landscape (10) insert. The energy landscape (10) starts in the superposition state (12) which is the lowest energy state of the quantum system. The conditions of the quantum system are controllably changed over time to allow the energy landscape to evolve over time from a superposition state (12) to a classical state (14). As the energy landscape transitions from the superposition state (12) to the classical state (14), multiple energy wells form that define the energy landscape (14). Each energy well corresponds to a particular quantum state of the quantum system. The expanded view in FIG. 1 of the energy landscape (14) shows that each energy well corresponds to a different set of qubit values. FIG. 1 shows that the minimum energy (Emin) for a four-qubit quantum system is given by the lowest energy well (16) in the whole landscape, where, in this example, qubits A and B have classical values of 0 when measured, whilst qubits C and D have classical values of 1 when measured.

By using such a set-up in FIG. 1, the methods described herein may therefore be used to provide inputs to a quantum system to solve a problem wherein a minimum energy state of the quantum system determines the qubit values according to the solution to the problem.

The inventors of the present method/system have realised that quantum computers, such as quantum annealers, may be used to find states of interest in large networks when the problem is framed in such a way that the state of interest of the system is also the minimum energy configuration in the quantum annealer (i.e. the ground state). Of particular interest is the case where the state of interest is also a stable configuration of the network.

States of interest are defined as those with a specific number of outgoing transitions to other states. A particular case of special relevance are stable states, which correspond to states with zero outgoing transitions to other states. Furthermore, states with one or more outgoing transitions to other states are of special interest with respect to constructing topological structures within the supernetwork, i.e. cycles. Although all the methods and ideas presented below allow to find any states of interest in the network (as defined above), we will often highlight the scenario where the state of interest is a stable state of the network throughout the text.

Quantum computers can greatly outperform the computational power of classical computers, especially at some particular tasks. One of the most prominent examples are complex optimization problems, where quantum annealers allow to find the optimal solution among a vast number of options and combination possibilities.

Figure 7:
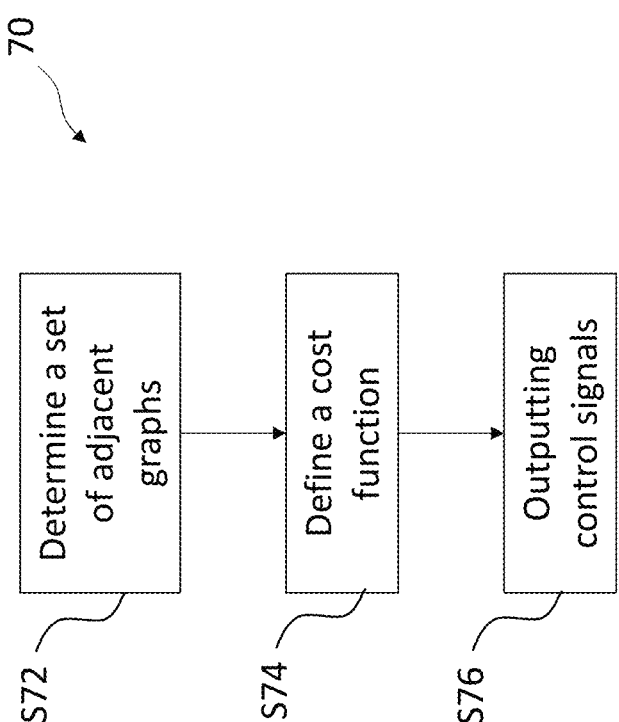
FIG. 7 shows an example of a method of driving a quantum computer to find one or more states of interest of a network.

There is therefore presented a method of driving a quantum computer to find one or more states of interest of a network. FIG. 7 shows an example of the method 70 wherein: step S72 determines a set of adjacent graphs; step S74 defines a cost function and step S76 outputs control signals. The method of FIG. 7 may be adapted according to any teaching herein including any of, but not limited to: how to determine the set of graphs, how to define the cost function and the nature of the control signals.

Figure 2:
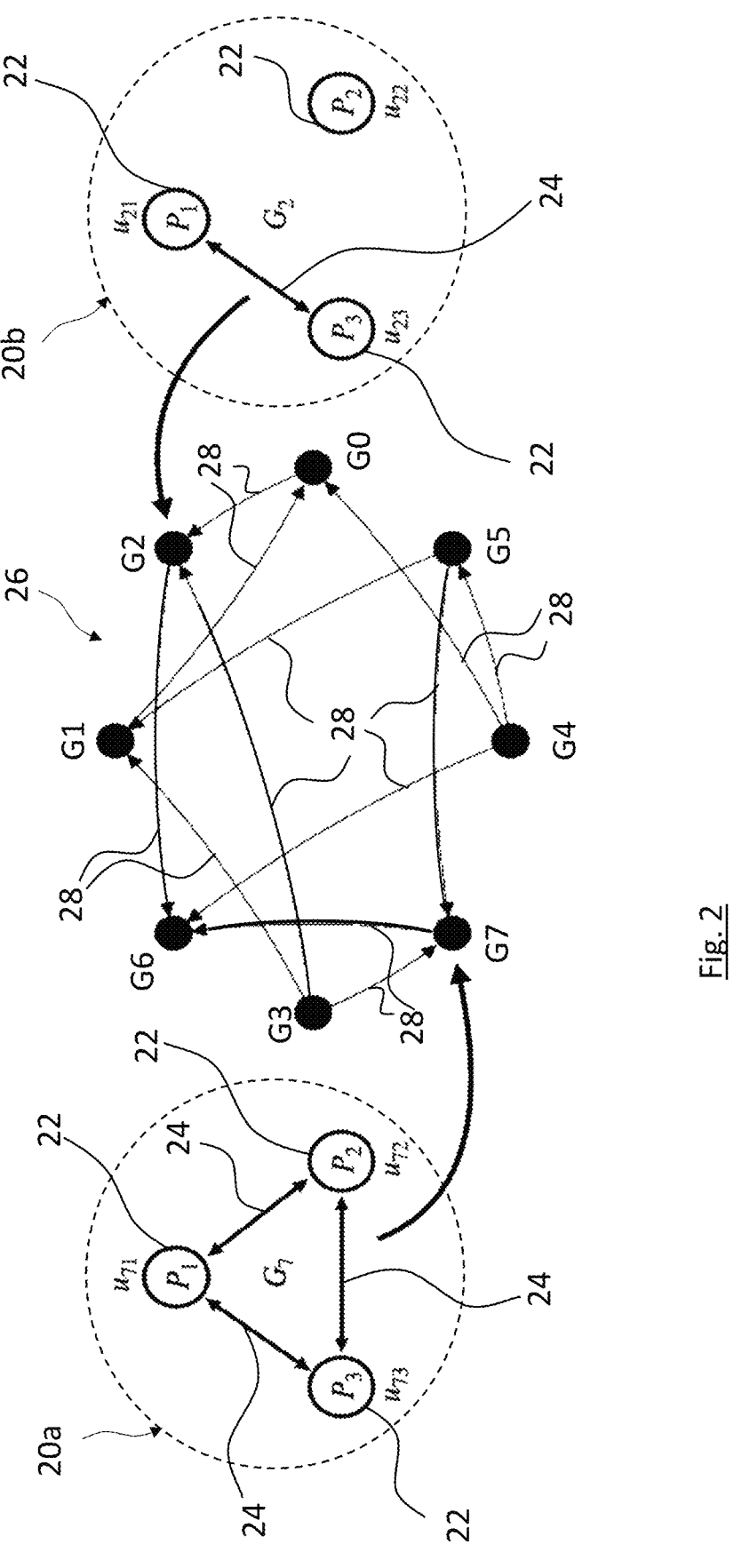
FIG. 2 shows an example of a supernetwork wherein each graph has three players.

An example of a network of players is shown in FIG. 2. The network comprising a plurality of players, labelled P1, P2 and P3 in FIG. 2. Each network configuration is represented by a graph comprising a plurality of players. For the example shown in FIG. 2, we use a graph containing three players, however any number of players 'N' can be used. Each player P1-3 is associated with a different vertex in a set of vertices in the graphs.

A set of different configurations for the network are represented by a set of graphs. FIG. 2 shows, in expanded view, two such graphs 20a and 20b. The players (22) in each graph may be connected to each other via a connection (24). Thus, for each graph there may be a set of one or more connections representing edges between the vertices wherein each connection connects two of the vertices in the graph.

Each graph comprises a different set of connections to any of the other graphs in the set of graphs. For example, in FIG. 2, in graph 20a: player P1 is connected to player P2 via one connection (24) and to player P3 via another different connection (24); player P2 is connected to player P3 via another connection (24). Graph 20a therefore has three connections (24) and three players (22). Correspondingly, graph 20b only has one connection (24) between player P1 and player P3. For each graph 20a/b, a corresponding set of utilities defines a net payoff that each of the players (22) obtain from a given graph configuration by having connections (24) to other players in the respective graph. Players (22) without any connections may also have a utility. In FIG. 2, graph 20a has utilities: $u_{71}$ for player P1, $u_{72}$ for player P2, $u_{73}$ for player P3, whilst graph 20b has utilities: $u_{21}$ for player P1, $u_{22}$ for player P2, $u_{23}$ for player P3. The utility is related to a benefit or gain or advantage that the player 22 has being in the state it is in with the connections (24) it has to other players (22). The utility of a player 22 may change depending upon the number of connections it has and which player/s it is connected to. The utility may be expressed as one or more numerical values. For example, a large positive value may indicate a high degree of satisfaction of a player in a given graph configuration. By contrast, a negative value may indicate a low degree of satisfaction of a player in a given graph configuration.

The set of graphs may form a supernetwork (26). In FIG. 2 there are eight graphs in the supernetwork (26) labelled G0, G1, G2, G3, G4, G5, G6, G7. Graph 20a represents the graph G7 whilst graph 20b represents G2. There are eight graphs in the supernetwork (26) because there are eight different graph configurations wherein each graph configuration has a different set of connections (24). In other words, each graph is different to another graph by at least one different connection or lack of connection. In general, if there are N players there are 'D' number of graphs in the supernetwork wherein $D=2^E$ wherein E is the total number of edges that may be formed between different pairs of players in a network. For example, in a fully connected network (where any player is connected to all other players) the total number of connections would be E=N (N−1)/2.

The method uses a classical computer, with a processor, to determine graph adjacencies. A graph is 'adjacent' to another graph if the connections between the two graphs differ by one. In other words when comparing a first graph to a second graph the first graph has the same connections between the same players as the second graph apart from either: one connection in the first graph that is not present in the second graph; or one connection in the second graph that is not present in the first graph. For example, in FIG. 2, graph 20a is not adjacent to graph 20b because there are two differences in the connections between the two graphs: in graph 20a player P2 has a connection to player P1 and another connection to player P3 whereas in graph 20b player P2 has neither of these connections (24); hence two connections are different between graphs 20a and 20b. Another graph (not shown) in the supernetwork (26) with no connections between any of the players (22) would be deemed adjacent to graph 20b because the connection between players P1 and P3 is the only difference between the two graphs. The method may determine whether graphs are adjacent or not in any suitable way. Additionally, the adjacent graphs for a given graph, G, can be directly determined by iterating over each of the edges in the total set of edges and then either appropriately adding or removing the edge for the given graph G.

Given the above conditions we now describe how to formulate parameters to drive the quantum computer, in particular a quantum annealer (although other quantum computers may be used such as, but not limited to a quantum system associated with a Variational Quantum Eigensolver). Further details about a quantum annealer for use with the method are described elsewhere herein.

Figure 3:
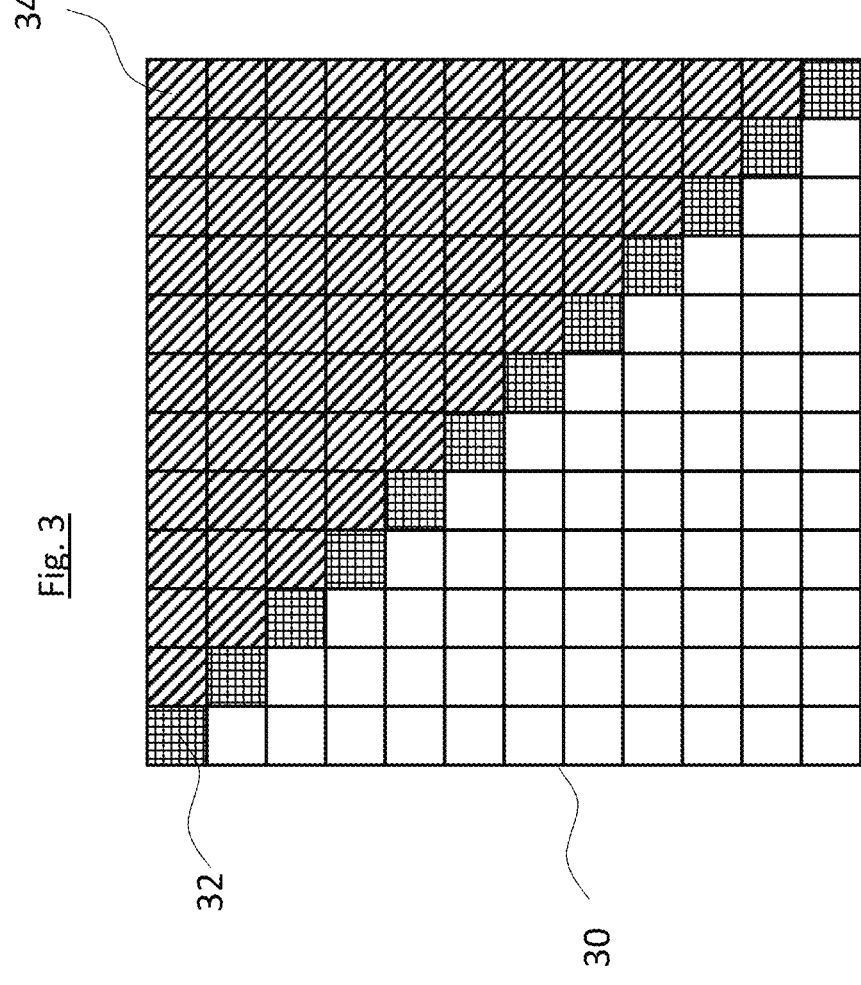
FIG. 3 shows the form of a QUBO matrix for use with a quantum computer.

The parameters to drive the quantum annealer may be derived in different ways and stored in different ways. In this example the Hamiltonian operator of the quantum system of the annealer has the final Hamiltonian represented by a QUBO model. FIG. 3 shows an example of an unfilled QUBO matrix (30) wherein the diagonal terms (32) (shown by cross-hatch filled squares) are the linear coefficients that are used to drive the qubit biases of the annealer whilst the off-diagonal terms (34) (shown by diagonal striped filled squares), in the upper right section of the matrix (30) are the quadratic coefficients for driving the couplers of the annealer.

A set of parameters are determined that factor in whether a graph in the supernetwork (26) is a state of interest of the network. These parameters may be derived from a cost function associated with a Hamiltonian operator of the quantum computer. There may be different ways of determining such parameters and/or cost function. The set of parameters may be determined at least by analysing the utilities of the vertices in the set of adjacent graphs.

Finding a state of interest in the supernetwork (26) is related to whether a viable transition can be made or not between adjacent graphs. A transition between adjacent graphs may be determined to be viable or non-viable. A viable transition between adjacent graphs in the supernetwork may be deemed to occur if any of two primary conditions are satisfied. The first primary condition A) is that a connection is added between the vertices (players) wherein: a) the utility of at least one of the said vertices is increased; and b) the utility of the other of the said vertices is increased or remains the same. The second primary condition B) is that a connection is removed between the vertices and the utility of one of the said vertices is increased. Either primary condition A) or B) may apply in a viable transition between adjacent graphs, but not both, in other words viable transitions between graphs are unidirectional. This can be visualised in FIG. 2 wherein the transitions 28 between the graphs G0-G7 each have a single arrow highlighting the one-way direction of the viable transition (also called a viable deviation).

The said parameters associated with the cost function manifest the above primary conditions such that viable transitions between adjacent graphs increase the energy of the quantum system whilst non-viable transitions between adjacent graphs lower the energy of the quantum system.

One type of state of interest is the stable graph. The stable graph configuration is where there are no viable transitions away from the graph. In the example of FIG. 2 graph G6 represents a possible candidate for such a stable graph because all of its transitions to adjacent graphs have arrows pointing towards G6, there are no viable transitions pointing away from G6 to any of the other graphs in the supernetwork (26).

Another type of stable configuration is a cycle. A cycle may be a subset of three or more graphs in the supernetwork (26) that form a basin of attraction wherein: a) each graph in the subset has at least one viable transition directed towards another graph in the subset; b) each graph in the subset has at least one viable transition being directed to that graph from another of the graphs in the subset; c) no viable transitions occur from any of the graphs in the subset towards any of the graphs not in the subset. The cycle may have viable transitions directed from graphs outside the subset towards graphs in the subset.

Figures 4A, 4B:
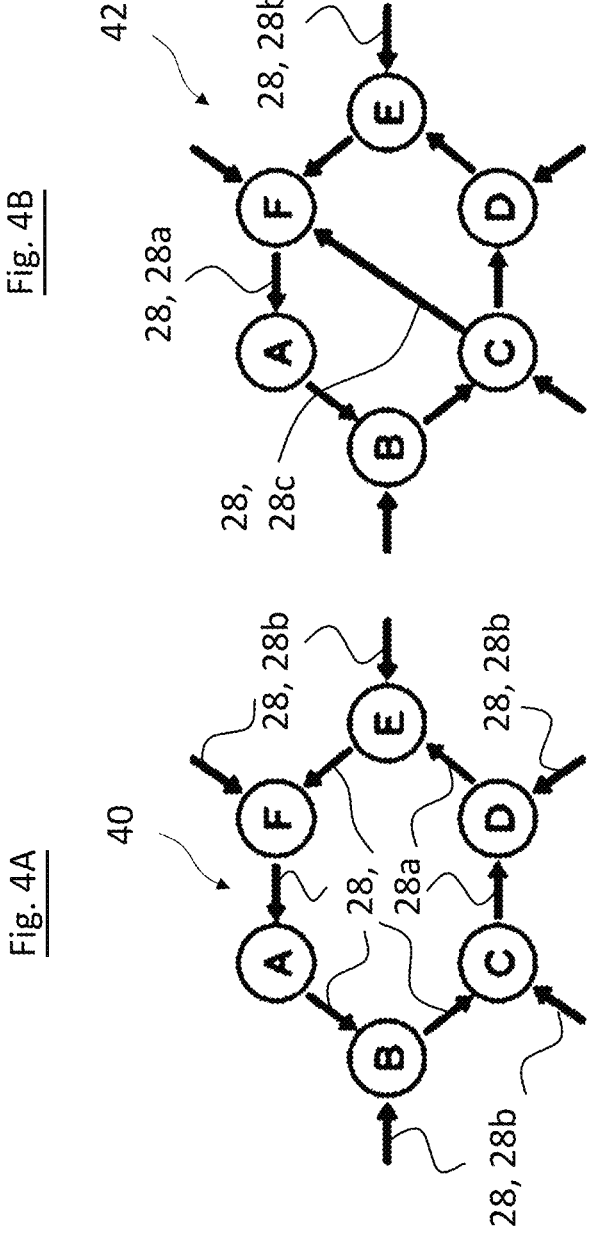
FIGS. 4a and 4b show examples of chordless and chordal cycles respectively.

FIG. 4*a* shows an example of a cycle. In this example the cycle is a chordless cycle (40) where each graph in the subset (labelled A-F in the figure) has a single viable transition directed outwardly towards a first other graph in the subset and a single viable transition being directed towards it from second other graph in the subset, thus forming a single loop of transitions (28*a*). Transitions 28*b* are shown directed towards graphs B, C, D, E, F but no transitions are shown being directed outwardly from the cycle (40) to graphs outside of the cycle (40).

FIG. 4*b* shows another example of a cycle that is similar to FIG. 4*a*. In this example the cycle is a chordal cycle (42) where each graph in the subset (labelled A-F in the figure) has: one or more viable transitions directed outwardly towards, respectively, one or more other graphs in the subset; and, one or more viable transition being directed towards it from, respectively, one or more graphs in the subset, thus forming a single loop of transitions 28*a* and transitions 28*c* within the loop. In this figure, graph C has an extra viable transition 28*c* towards graph F allowing for a main loop and two sub-loops.

In the above discussion of cycles, it is to be understood that different numbers of graphs may form the cycle and that other chordal or chordless configurations with different viable transitions are also possible.

Other states of interest are states where the graph has a predetermined number of viable transitions. For example, graphs with only one or two viable deviations. These states of graphs are interesting in the context of topological structures such as the aforementioned stable cycles which are composed of such graph states.

As discussed elsewhere herein, the parameters for driving (or running) the quantum computer may be derived from several factors. These factors set out the problem and may include any one or more of, but not limited to: player utilities before and after a viable transition and the viable transitions between adjacent graphs. One or more cost functions may be used to derive these parameters. The one or more cost functions may have one or more cost terms that affect qubits and couplers in the quantum system. For any given qubit 'qi' having a coupling to qubit 'qj', the cost terms may be written as qubit interactions (qi*qi or qi*qj), which can be immediately translated into a model, such as a QUBO matrix, for driving the quantum computer.

A cost function may include one or more general cost terms 'M' for link addition/removal, one or more penalising terms 'P' and one or more further terms 'D' and 'D̂'. In each of these terms there may be: a) qubit interactions of the form qi*qi (which are the elements in the diagonal of the QUBO matrix); and/or, b) qubit interactions of the form qi*qj (which are the off-diagonal terms of the QUBO matrix). Note that qi*qi=qi, because qi always equals 0 or 1. In the following discussion the method uses both types of interaction a) and b) in each cost term.

The cost term 'M' describes the cost involved in determining the change in utility (Δu) for the two players (player 1 or player 2 in the consideration) involved in the transition. The cost is reflected in the contribution to the energy of the quantum system. This M term identifies the costs associated with any algorithmic component used to determine the change in utility (Δu) for the two players. Such an algorithmic component may for example be reading entries from a matrix, or evaluating inequalities. The costs involved may occur when such an algorithmic component is said to 'fail', for example: in the case of reading an incorrect matrix entry; or an inequality being violated.

As described above, there may be one or more penalty terms 'P'. In the following discussion two penalty terms are discussed however there may be just one such term or three or more of them. The penalty terms 'P' may introduce a penalty for adding or removing a link when the action should not be taken. In other words, these terms penalize the addition or removal of a given link when it is not in the interest of any of the players involved in the decision (i.e., when it breaks the rules for adding or removing the link). One penalty term is associated with link addition, the other associated with link removal. These terms can have a null (no penalty) or positive (a rule is broken) contribution to the total energy of the quantum system. These terms ensure that configurations that satisfy the link addition and removal rules have lower energies than those that break these rules. Links that break the rules are penalized with a positive contribution to the energy.

As described above, other terms may also be used to set the parameter. Other examples are the terms: 'D' that counts the number of viable deviations from the graph state Gi to any other adjacent graph; and 'D̂' that compares the number of viable deviations to the desired number of viable deviations for a state of interest. The cost 'M' and penalty 'P' terms ensure that the players' interest is in accordance to the benefit they would obtain from a transition, and that the final decision respects the link addition and removal rules of the system. However, these 'M' and 'P' terms do not quantify the number of outgoing viable deviations of the considered graph. This 'D' term counts the number of links that are added or removed; in other words, it counts the number of viable transitions from a graph to any other adjacent graphs. Since states of interest are defined by their number of outgoing viable transitions, which is known beforehand and provided to the algorithm as an input, the 'D̂' term introduces an extra positive contribution to the energy for all the states with a number of outgoing viable transitions different to the one provided as an input to the algorithm. In this way, the 'D̂' term favours states with a specific number of outgoing viable transitions. A specific case of particular interest may be stable states, which are characterized by having zero outgoing viable transitions, or graphs that are part of a chordless or a chordal cycle, which are characterized by having one or two outgoing viable transitions. However, we remark that the number of desired viable transitions of the states of interest to be found by the method may be set to any number of interest.

Further detailed examples of the above terms are described elsewhere herein. It should be understood that such further details in other examples are non-limiting and that many different ways of forming energy-cost terms may be used with the current method.

After the parameters have been derived as described above, for example by populating a QUBO matrix, the method then outputs a plurality of control signals for driving the quantum computer. The control signals are associated with the set of parameters (for example in the QUBO matrix) and comprise one or more control signals for controlling the states of qubits in the quantum computer; [e.g., the qubit biases in a quantum annealer]; and, one or more control signals for controlling the entanglement of qubits in the quantum computer [e.g., the coupler strengths and state in a quantum annealer]. It is noted that other control signals may be used for driving the quantum computer that may or may not be transmitted from the processor performing the method. For example, a separate computing system may be used to operate other parts of the quantum computer such as, but not limited to signals to control the temperature in a cryogenic chamber.

The method may further include any one or more of: applying the control signals to the quantum computer; operating the quantum computer (such as controlling an anneal) and measuring the output states of qubits of the quantum computer.

The method may therefore allow the finding of configurations of interest of large networks under certain assumptions. States of interest in the supernetwork may be characterized for having a specific number of outgoing viable deviations. In particular, stable networks may be characterized for having zero outgoing viable deviations. Furthermore, chordless cycles may be formed by states with only one outgoing viable deviation. In chordal cycles, one of the states can have two outgoing deviations. In general, the allowed number of outgoing deviations scales with the number of edges in the network. As a result, the number of outgoing viable deviations of a given graph is usually large for a large number of players.

For this reason, the parameters to operate the quantum computer to address finding configurations of interest may be formulated as a minimization problem with respect to the number of outgoing viable deviations around a specific value of interest. The method may analyse the number of outgoing viable deviations for all possible network configurations in the whole supernetwork. There may be at least three pieces in this analysis including, but not limited to:

1. Analysing how the utility of each player changes from one network configuration to any adjacent network.
2. Analysing whether the transition should be allowed or not as a function of the utility change in the previous step.
3. Assigning a contribution to the energy of the system to each viable (positive contribution) or non-viable (null contribution) deviation. The method may also penalise undesired behaviours such as incorrectly identifying viable transitions as non-viable, or non-viable as viable.

The method may therefore define a function (to be minimized) that assigns large values to states with a number of outgoing viable deviations different to that of the states of interest, and low values to states with a number of outgoing viable deviations that equals that of the states of interest. Once again, a case of special interest may be finding stable graphs and graphs that may be part of a cycle. In this specific case, the method may define and minimize a function that assigns large values to states with multiple outgoing viable deviations, and low values to states with none or few outgoing viable deviations. This method may be optimally run on a quantum annealer. The reason for this is that the formulation of the problem may be ideal to be minimized in a quantum annealing process.

For a system with three players as shown in FIG. 2, all the possible network configurations can be embedded into the supernetwork (26). The supernetwork (26) describes the dynamics of the system wherein each directed edge 8 indicates viable transitions between adjacent graphs G0-G7. While previous approaches may try to embed all the information of the supernetwork into an adjacency matrix, the method presented herein optimises the local adjacency structure of each network.

The local adjacency structure of each network is optimised independently. As described above and in the example underneath, when the algorithm is applied to find stable configurations in the network, each outgoing viable deviation of a candidate network may give a large positive contribution to the energy of the quantum system. By contrast, each outgoing nonviable deviation may give a null contribution to the energy of the system. As a result, network configurations with increasing numbers of viable outgoing deviations have larger energies. Note that states of interest may have zero, one or two outgoing deviations, which means that they may always have low energies. The method is preferably run on a quantum annealer, although other quantum computational methods may be applied instead; or other classical computational methods for solving QUBOs. At the end of the annealing process, the output of the quantum computer may be a state with a low energy with a very high probability.

The annealing process can be run multiple times to obtain a sample of networks with low energies. The energy of each network in the sample is proportional to the difference between the number of viable outgoing deviations of the network and the number of viable outgoing deviations of the states of interest. For example, if we were interested in finding states with zero outgoing viable deviations, the energy of each network in the sample will equal their number of outgoing viable deviations squared. As a consequence, the states of interest may be immediately identified in the sample provided by the quantum algorithm. This sample of networks can then be further analysed using a classical post-processing algorithm. This classical algorithm may further take all the networks with one and/or two outgoing viable deviations and try to find a chordless or chordal cycle. The classical algorithm may be built using publicly available Python packages.

As discussed, the method provides the ability to find the stable configurations of a network on a quantum computer. In the past, classical algorithms have been used to solve this problem for small networks. However, these algorithms cannot be applied to larger networks. Previous approaches attempt to embed all the information about the system into an adjacency matrix which describes the dynamics of the full system. For dynamic network formation, this is not an efficient solution. The method presented herein differs by embedding only the relevant information of the network into the problem. More specifically, the method presented herein may: search for a candidate network configuration; minimise the dynamic behaviour of the candidate network; target networks with specific numbers of outgoing deviations.

Difference to other approaches may also include that the present method optimises over the local adjacency structure of each candidate network. The local adjacency structure is computed by iterating over all edge bases and dynamically evaluating network formation rules.

The method presented herein may directly embed the dynamic conditions for network formation. Considering the Jackson and Watts network formation rules: a) to embed the utility change of a network, the present method may use a form of linear operators to represent the derivative of a convex utility function for each player; b) to embed the sign of the utility change of a network, the present method may embed this in a precomputed matrix and then perform a series of mapping constraints to read the required entry of the matrix; c) to embedding the edge formation/removal rules, the present method may use a series of constraints to simulate logical gates ("and" and "or") and use these to implement the edge formation/removal rules.

The method can produce a quadratic unconstrained binary optimisation (QUBO) cost function that is optimised using the proposed methods. The sampling of the minimisation problem may be done on a quantum annealer. As mentioned before, the stable networks are immediately identified in the sample of states provided by the quantum annealer, since they are characterized by having zero energy. A classical post-processing may be used to construct sets of stable cycles using the subset of networks found by the quantum annealer.

The method can be used to find the stable configurations of a network of an arbitrary size (provided that the hardware in the quantum annealer has the appropriate size). Furthermore, the proposed method may scale quadratically (in resources) with the number of network players (nodes), whereas classical algorithms would scale super-exponentially (as 2^E) due to the adjacency matrix structure.

Example

There now follows a non-limiting example of the method and system. This example may be adapted according to features described elsewhere herein, equally other examples described herein may be adapted with any of the features described in this example. The features that may be adapted by or adapt other examples include any of, but not limited to: any one or more of the definitions 1-21; and their associated explanations; any of the theorems and their corollary's; the example overall strategy; the algorithms 1 and 2; the formation and costs functions/terms associated with the Hamiltonian; the QUBO functions and/or formulation; utility functions; fixed and linear utility models, any of the matrices (for example delta and sign); detecting cycles. Any of the steps in this example may be omitted and/or replaced. Further steps, definitions and other elements of the method may be included. Steps and features referenced to the term 'algorithm' should be interpreted equivalently as steps and features of the method and/or system implementing such a method.

The definitions presented below refer to the structure and characteristics of the network (definitions 1 to 4), the evolution of the network (definitions 5 and 6), and the stable configurations of the network (definitions 7 to 13).

Definition 1. Suppose that there is a set of N players that can form links between themselves. Let $G \in \underline{G}$ denote a graph with a set of vertices that represent the N players, and a set of edges that indicate the connections between the players. Here $\underline{G}$ denotes the space of all graph configurations. Let $\underline{B} = \{e_1, \ldots, e_E\}$ be the canonical basis that describes all the possible link connections between two players, where $E = N(N-1)/2$ is the dimension of the edge space. By construction, the dimension of the graph space G is $D = 2^E$. Therefore, any $G \in \underline{G}$ can be written as a linear combination of the arrays in $\underline{B}$. Formally, G may be expressed as:

$$G = \sum_{i=1}^{E} w_i e_i \qquad \text{[Eq. 1]}$$

where each of the weights $w_i \in \{0, 1\}$ indicate whether the link $e_i$ exists (1) or not (0). As an example, for N=3 we have that E=3 and thus $e_1 = (1, 0, 0)$, $e_2 = (0, 1, 0)$ and $e_3 = (0, 0, 1)$.

Definition 2. For every graph $G \in \underline{G}$, we define a utility vector $U_G = (u_1, \ldots, u_N)$ that represents the net payoff that each of the players is receiving from their existing connections in that graph configuration. As a result, the following matrices may contain all the information about the system.

$$\mathbb{G} = \begin{pmatrix} G_1 \\ \vdots \\ G_D \end{pmatrix} = \begin{pmatrix} g_{11} & \cdots & g_{1E} \\ \vdots & \ddots & \vdots \\ g_{D1} & \cdots & g_{DE} \end{pmatrix}_{2^E \times E}, \qquad \text{[Eq. 2]}$$

$$\mathbb{U} = \begin{pmatrix} u_1 \\ \vdots \\ u_D \end{pmatrix} = \begin{pmatrix} u_{11} & \cdots & u_{1N} \\ \vdots & \ddots & \vdots \\ u_{D1} & \cdots & u_{DN} \end{pmatrix}_{2^E \times N},$$

Definition 3. Any two graphs Gi and Gj are said to be adjacent if the difference $$\Delta G_{ij} = G_j - G_i \qquad \text{[Eq. 3]}$$

satisfies $|\Delta G_{ij}| = 1$. In other words, only the graphs differing by one edge are adjacent. The transition from $G_i$ to $G_j$ is called deviation. From now on, only deviations between adjacent graphs will be considered. As a consequence, note that $|\Delta G_{ij}| = \in \underline{B}$ and therefore all possible deviations among graphs are naturally described in the canonical basis.

Definition 4. For any two adjacent graphs $G_i$ and $G_j$, the difference in utilities associated to the transition $\Delta G_{ij} = G_j - G_i$ is given by $\Delta u_{ij} = u_j - u_i$. By construction, we will assume that the addition or removal of any link $\Delta G_{ij}$ only affects the two players p and p' involved in the connection. That is, for any given deviation we have that:

$$\Delta u_{ij} = \qquad \text{[Eq. 4]}$$

$$(u_{j,1} - u_{i,1}, \cdots, u_{j,p} - u_{i,p}, \cdots, u_{j,p'} - u_{i,p'}, \cdots, u_{N,1} - u_{N,1}) =$$

$$(0, \cdots, 0, u_{j,p} - u_{i,p}, 0, \cdots, 0, u_{j,p'} - u_{i,p'}, 0, \cdots, 0).$$

In other words, the utility of any player that is not connected by $G_{ij}$ will remain constant.

Definition 5. A deviation between any two adjacent graphs $G_i$ and $G_j$ is viable if the two players that are affected by the transition from $G_i$ to $G_j$ agree to make the transition according to rules. These rules include:

A) Link addition: the utility of one of the players involved in the transition must be strictly increased, while the utility of the other player involved in the transition must be either strictly increased or remain the same; or B) Link removal: the utility of one of the players involved in the transition must be strictly increased.

Definition 6. We define the supernetwork $S_G$ as a directed graph with vertices representing all possible graph configurations $G \in \underline{G}$ of the system, and links connecting all the adjacent graphs with a viable deviation. In other words, the nodes of SG are the set of all possible graph configurations and thus $G \in S_G \subseteq \underline{G}$, and the edges connecting the nodes of $S_G$ denote all viable 1-edge transitions between the different graph configurations.

Definition 7. A graph configuration $G_0$ is stable if there is no viable transition from $G_0$ to any other adjacent graph $G_j$ of the supernetwork $S_G$.

There is now presented a set of assumptions about the structure of stable cycles.

Definition 8. A set of networks C={G1, . . . , Gn} form a cycle if for any $Gi \in C$ and $Gj \in C$ there exists an improving path from Gi to Gj, which is defined as a directed finite sequence of adjacent graphs with viable transitions between them connecting the graphs Gi and Gj.

Definition 9. A cycle C is a maximal cycle if it is not a proper subset of a cycle.

Definition 10. A cycle C is a closed cycle if there is no network in C that participates on an improving path ending on a network that is not in C. A closed cycle is necessarily a maximal cycle.

From these assumptions, we can infer the following properties about the cycles that can appear in the supernetwork SG.

Definition 11. A closed cycle C of length n in the supernetwork $S_G$ is defined as a finite sequence of distinct edges {$e_1$, . . . , $e_n$}, which joins a sequence of adjacent graphs {$G_1$, . . . $G_n$, $G_1$}. Definitions 8 to 10 have two important consequences. First, the only repeated graphs in a closed cycle are the first and last graphs. Second, there is no graph in a closed cycle with an outgoing edge to an adjacent graph that is not part of the cycle.

Definition 12. A chordless cycle in the supernetwork $S_G$ is defined as a closed cycle such that no two graphs of the cycle are connected by an edge that does not belong to the cycle. As a consequence, all graphs in a chordless cycle have exactly one outgoing edge.

Definition 13. A chordal cycle in the supernetwork $S_G$ is defined as a closed cycle that contains a chord, which is an edge that is not part of the cycle but connects two graphs of the cycle. As a consequence, all graphs in a chordal cycle have exactly one or two outgoing edges, which always lead to a graph that belongs to the cycle. More specifically, the graphs in the cycle that form a chord have exactly two outgoing edges, while the rest of the graphs that form the cycle have only one outgoing edge.

As shown in FIG. 4a, the collection of graphs C={$G_A$, $G_B$, $G_C$, $G_D$, $G_E$, $G_F$} form a chordless cycle. Note that each of the graphs in the cycle only have one outgoing edge, which always leads to a graph that belongs to the cycle. As shown in FIG. 4b: The collection of graphs C={$G_A$, $G_B$, $G_C$, $G_D$, $G_E$, $G_F$} form a chordal cycle. This cycle is formed by adding a chord between the graphs $G_C$ and $G_F$ of the previous chordless cycle. Note that all the graphs in the cycle that do not have a chord only have one outgoing edge, while the graphs that form a chord have two outgoing edges, both leading to a graph that belongs to the cycle.

Using the previous definitions, we can derive the following theorems:

Theorem 1. In a chordless cycle C={$G_1$, . . . , $G_n$} of size n<6 each node can at most only have one outgoing edge to an adjacent node.

Proof of this Theorem 1, is now provided underneath.

For a single valid deviation from a graph $G_i$ to and adjacent graph Gin, we have that $\|G_i \ G_{i+1}\|=1$. Edges are constrained to be unidirectional, which implies that:

$$(G_i - G_{i+1}) \neq -(G_{i+1} - G_{i+2}). \qquad \text{[Eq. 5]}$$

Furthermore, deviations are additive and thus:

$$G_i - G_{i+2} = (G_i - G_{i+1}) + (G_{i+1} - G_{i+2}). \qquad \text{[Eq. 6]}$$

Using the unidirectional constraint defined in Eq.5 we find:

$$\|G_i - G_{i+2}\| = 2, \qquad \text{[Eq. 7]}$$

which implies that $G_i$ and $G_{i+2}$ cannot be connected. For a valid deviation $G_{i+2} \rightarrow G_{i+3}$, using the additive rule we obtain:

$$G_i - G_{i+3} = (G_i - G_{i+1}) + (G_{i+1} - G_{i+2}) + (G_{i+2} - G_{i+3}). \qquad \text{[Eq. 8]}$$

The first internal connection (i.e. chord) that can be formed between two graphs in the cycle is $G_i \rightarrow G_{i+3}$ if and only if $\|G_i - G_{i+3}\|=1$. This requires that:

$$(G_{i+2} - G_{i+3}) = -(G_i - G_{i+1}). \qquad \text{[Eq. 9]}$$

Indeed, if this is the case then Eq.8 gives $$G_i - G_{i+3} = G_{i+1} - G_{i+2}, \qquad \text{[Eq. 10]}$$

and taking the norm we see that $\|G_i - G_{i+3}\|=\|G_{i+1} - G_{i+2}\|=1$. This implies that the distance between two graphs in a cycle to form a chord is at least 3 nodes. Since the cycle is closed, this distance must be at least half the cycle size. This requires that the size of the cycle must be at least n=6 for a chord to exist.

Corollary 1. The size of a chordless cycle is bounded by $n_c > 3$. This is as a direct result of the previous proof.

Corollary 2. The size of a chordless cycle is always even. This is as a direct result of the previous proof.

Corollary 3. Alternate graphs in a cycle must share the same deviation in edge basis with opposite signs. This is as a direct result of the previous proof.

Corollary 4. A chordless cycle of size $n_c \geq 6$ will have at least $n_c=2$ nodes that have only one outgoing deviation, and at most $n_c=2$ nodes that have two or more outgoing deviations.

Corollary 5. Extending the previous theorem we can see that for a chordless cycle to have nodes with more than 3 outgoing deviations $n_c \geq 12$.

More generally we can observe the following result.

Theorem 2. The maximum number of internal outgoing deviations a single graph can have within a chordless cycle of size $n_c$ is $d=\mathrm{floor}(n_c/6)+1$.

Example Overall Strategy

The size of the problem may be defined in Eq. 2 and may be determined by the total number of possible graph configurations, $D=2^E$, with $E=N(N-1)/2$ for a complete graph, where N is the number of players in the network. The inventors have realised that a classical approach to this problem may consist in building the supernetwork $S_G$, introduced in Definition 6, and encoding it in a squared matrix (adjacency matrix) of size $2^E\times2^E$. In this matrix, each row and column represents a possible graph configuration. The entries of this matrix are binary (i.e., 0 or 1) numbers. The entry (i, j) of the adjacency matrix denotes whether the graph configuration j can be reached from the graph configuration i by adding or removing a single link according to the rules introduced in Definition 5. Once the adjacency matrix is built, the number of viable transitions for a given graph can be determined by counting the number of non-zero elements in the row, and stable cycle configurations of the system can be found using, for example, a Markov Chain Monte Carlo process. The inventors have determined that the main problem of this approach is determined by the exponential scaling in the size of the adjacency matrix, which makes the problem computationally intractable for more than a few players. Thus, the following strategy may be used.

For a given set of N players and a given function that allows to calculate the utility of a player, this example illustrates how the method can be used to find the stable graph or closed cycle of graphs of the system. For any system of N players there always exists either a stable graph or a stable cycle (as demonstrated in the reference "The evolution of Social and Economic Networks", Jackson and Watts, Journal of Economic Theory, vol. 106, issue 2, October 2002). In order to find such configurations, the method may apply a minimization procedure to find the graph $G_0\in\underline{G}$ with the least viable number of deviations. For all possible initial graphs $G_{in}$, the method may dynamically create the E possible deviations of the surrounding graphs by adding and subtracting the basis vectors from the canonical basis $\underline{B}$. For each of these deviations, an entry of the sign matrix is read for the two players to determine whether their change in utility from one graph configuration to an adjacent one is positive or negative. The cost function may be defined in such a way that viable deviations increase the energy of the quantum system, whereas non-viable deviations give null contribution to the energy of the quantum system. This approach may guarantee that stable configurations have very low energies. Formally, if the method defines $A_{SG}$ as the directional adjacency matrix of the supernetwork $S_G$ of all viable deviations, then the method can find the stable graph $G_0$ by minimizing:

$$G_0 = \min_{\vec{x}}(\vec{x}\cdot A_{S_G}), \qquad\qquad \text{[Eq. 11]}$$

where $\vec{x}=(x_1, \ldots, x_D)$ is a D-dimensional array with elements $xi=\{0;1\}$, and it satisfies:

$$\|\vec{x}\| = 1.$$

Importantly, classical algorithms rely on the construction of the adjacency matrix $A_{SG}$ of viable deviations. As the number of players increases, the dimension of the space G of possible graphs and the size of the adjacency matrix $A_{SG}$ grows as $2^E$. This means that building the adjacency matrix becomes an intractable computation, limited by memory and other such computational resources, for a large number of players. Therefore, the inventors have determined that it may be desirable not to want rely on encoding the full adjacency matrix. An alternative approach consists in encoding the adjacency row of deviations, $a_G\in A_{SG}$, for an arbitrary graph G. Since we know that adjacent graphs differ by only 1 edge, then the vector to minimize will have a maximum of $E=N(N-1)/2$ valid deviations. Therefore, this vector is now only quadratic in the number of players N and linear in the edge space $\underline{B}$. In this way, the problem is reduced to finding:

$$a_0 = \min_{a_G}(\|a_G\|). \qquad\qquad \text{[Eq. 12]}$$

In this way, the problem is reduced to finding the graph G0 that satisfies Eq.12.

Example Mathematical Formulation of the Problem

For a given initial graph Gin, the algorithm will iterate over the set of all deviations $\Delta Gi=Gi-Gin\in\underline{B}$, to analyse the transitions from $G_{in}$ to all its adjacent graphs. The total cost function to be minimized may be described by the Hamiltonian:

$$\mathcal{H} = \rho_1 + \sum_{i=1}^{E}(\rho_2 M^i + \rho_3 P_r^i + \rho_4 P_a^i + \rho_5 D^i)E + \rho_6\hat{D}, \qquad \text{[Eq. 13]}$$

where M is a cost term, $P_r$ and $P_a$ are penalty terms and D counts the number of viable deviations. These terms are also described elsewhere herein. The parameters $\rho_1, \ldots, \rho_5$ describe the shape of the energy spectrum and have an impact on the energies of all the states in the system, and may therefore be tuned for optimal performance. The summation is over all possible deviations between players, defined as a link addition (when the link between the two players does not exist) or a link removal (when the link between the two players already exists).

To set up the mathematical formulation of the problem the proceeding example definitions are introduced.

Definition 14: Canonical Basis Vector. A canonical basis vector is a vector, $\vec{\iota}$, with binary entries such that the inner product $\vec{\iota}\cdot\vec{\iota}=1$, i.e. there is only one non-zero entry. More explicitly $\vec{\iota}=\{0,1\}^n$; $\vec{\iota}\cdot\vec{\iota}=1$.

Definition 15: Player State. For a given graph G every player P will have an assigned numerical value defined as the 'player state'. The player state is denoted as $\chi_p=f(G, P)$, where the right-hand side is a function of the player w.r.t the edges of the graph G and is known as the 'player functional'.

For example, a player state may be the total number of edges a player is involved in in graph G. This is known as the cardinality of player and is denoted by |P|.

Definition 16: Adjacent Player State. Two player states are said to be adjacent when the two states are functions of respective adjacent graphs. $f(G, P)$ is adjacent to $f(G\pm e, P)$, where e is a basis vector of the graph representation and $G\pm e$ is adjacent to G.

Definition 17: Player Functional. The 'player functional' is the function $f(G, P) \to \mathfrak{R}$ which is a mapping of the player P to a real number w.r.t the graph G.

In particular, we are interested in player functionals that are a linear function of the basis decomposition of G. Such functions can be expressed by the inner product of the vectors $G \cdot \underline{f}_p$, where this is the inner product between the vector representation of G and a vector $\underline{f}_p$ that is equivalent to the player functional.

For example, the player cardinality |P| is a linear function of G that counts the total number of edges a player is involved in. The functional vector for |P| is the vertex row of the graph Laplacian. For a three player example player 1, $P_1$, can be connected to both player 2 and 3, where the respective edges are given by the basis vectors [1, 0, 0], [0, 1, 0]. Therefore the vector form of $\underline{f}_1 = |P_1| = [1, 1, 0]$. Taking $G \cdot f_1 = G \cdot [1, 1, 0]$ will return an integer value of the number of edges in G that $P_1$ has.

Furthermore, under the assumption of a linear functional the states are linearly separable and it can be seen that adjacent states are related by $$f(G \pm e, P) = f(G, P) \pm f(e, P).$$

Definition 18: Utility Function. The definition of the utility function of a player can be generalised as a function u of the player state given as $u(f(G, P)) \to \mathfrak{R}$. The utility function can for example: be the identity mapping s.t. $u(f(G,P)) = f(G,P)$; a polynomial of $f(G,P)$; or any other real valued function of $f(G,P)$.

Now that the player state is denoted as $\chi_p$, what if we use $\chi_p(G)$ and $\chi_p(G \pm e)$?

The 'change in the utility function' may given by $$\delta u(f(G, P))^+ = u(f(G + e, P) - u(f(G, P)),$$
$$\delta u(f(G, P))^- = u(f(G - e, P) - u(f(G, P)),$$

where the first equation corresponds to cases of edge addition and second equation for edge removal. For example, consider a linear player functional, and a second order polynomial utility function given by $$u(f(G, P)) = f(G, P)(c_1 + c_2 f(G, P)) + k.$$

The change of utility between adjacent states is given $$\delta u(f(G, P)) =$$
$$[f(G \pm e, P)(c_1 + c_2 f(G \pm e, P)) + k] - [f(G, P)(c_1 + c_2 f(G, P)) + k]$$

where we can now use the linear separable property of the linear player functional to get $$\delta u(f(G, P)) = [(f(G, P) \pm f(e, P))(c_1 + c_2 f(G, P) \pm c_2 f(e, P)) +$$
$$k] - [f(G, P)(c_1 + c_2 f(G, P)) + k] =$$
$$\pm [c_1 f(e, P) + c_2 f(e, P)(2f(G, P) + f(e, P))] =$$
$$\delta c_1 f(e, P) + 2\delta c_2 f(G, P) f(e, P) + c_2 f(e, P) f(e, P); \delta = \pm 1$$

For example, consider the linear player functional the cardinality |P| of a player and a second order polynomial utility function given by $$u(f(G, P)) = f(G, P)(c_1 + c_2 f(G, P)) + k.$$

For the cardinality it can be seen that $\pm f(e, P) = \pm 1$ where the cardinality either increases or decreases by one for a state transition to an adjacent state. The change in utility function for state transitions with respect to edge addition and removal are given by $$\delta u(f(G, P))^+ = c_1 + c_2(2|P| + 1),$$
$$\delta u(f(G, P))^- = -c_1 - c_2(2|P| - 1).$$

Definition 19: Delta Matrix. The delta matrix $\Delta$ contains the information regarding the change of value for the utility function, as previously defined, between adjacent player states. The columns of the matrix correspond to player state transitions and the rows correspond to each individual player. There are two sets of columns, the first set of columns corresponds to state transitions to adjacent states when an edge is added to G and the second set for when edges are removed; the delta matrix can be partitioned into $\Delta^+$ and $\Delta^-$ corresponding to each of these sets, respectively.

For example, assume a homogeneous set of players, all players have the same state and utility functions. The set of N player states is given by $f(G, P) \in \{\chi_0, \chi_1, \ldots, \chi_{N-1}\}$, and the number of possible player states is denoted by $|\chi|$. We will denote the set of graphs $G^i_\chi \subset G$ as the set of graphs where $G^i_\chi = \{f(G, P) \to \chi_i; G \in G^i_\chi\}$. The delta matrix has the form:

$$
\begin{pmatrix}
\chi_0^+ & \chi_1^+ & \cdots & \chi_{|\chi|}^+ & \chi_0^- & \chi_1^- & \cdots & \chi_{|\chi|}^- \\
\delta u_0(\chi_0)^+ & \delta u_0(\chi_1)^+ & \ldots & \delta u_0(\chi_{|\chi|})^+ & \delta u_0(\chi_0)^- & \delta u_0(\chi_1)^- & \ldots & \delta u_0(\chi_{|\chi|})^- \\
\delta u_1(\chi_0)^+ & \delta u_1(\chi_1)^+ & \ldots & \delta u_1(\chi_{|\chi|})^+ & \delta u_1(\chi_0)^- & \delta u_1(\chi_1)^- & \ldots & \delta u_1(\chi_{|\chi|})^- \\
\vdots & & & & & & & \\
\delta u_N(\chi_0)^+ & \delta u_N(\chi_1)^+ & \ldots & \delta u_N(\chi_{|\chi|})^+ & \delta u_N(\chi_0)^- & \delta u_N(\chi_1)^- & \ldots & \delta u_N(\chi_{|\chi|})^-
\end{pmatrix}
$$

where the first row above the line is for visual reference only and denotes the state transition associated with the given column.

For example, consider the linear player functional the cardinality |P| of a player and a second order polynomial utility function given by $$u(f(G, P)) = f(G, P)(c_1 + c_2 f(G, P)) + k.$$

The set of player cardinality states where there are N fully connected players are given by $f(G, P) \in \{0, 1, \ldots, N-1\}$, using the result for the change in utility from previous examples the delta matrix has the form $$\begin{pmatrix} 0^+ & 1^+ & \ldots & (N-1)^+ & 0^- & 1^- & \ldots & (N-1)^- \\ \text{---} & \text{---} & \text{---} & \text{---} & \text{---} & \text{---} & \text{---} & \text{---} \\ c_1 + c_2 & c_1 + 3c_2 & \ldots & c_1 + c_2(2N-1) & -c_1 + c_2 & -c_1 - 2c_2 & \ldots & -c_1 - c_2(2N-3) \\ \vdots & & & & & & & \\ c_1 + c_2 & c_1 + 3c_2 & \ldots & c_1 + c_2(2N-1) & -c_1 + c_2 & -c_1 - 2c_2 & \ldots & -c_1 - c_2(2N-3) \end{pmatrix}$$

where the first row above the line is for visual reference only and denotes the state transition associated with the given column.

Definition 20: Sign Matrix. The 'sign matrix' is defined as the elementwise sign operation of the delta matrix: $S = \text{sign}(\Delta)$. The sign matrix can be partitioned following the partition of the delta matrix, $S^+ = \text{sign}(\Delta^+)$ and $S^- = \text{sign}(\Delta^-)$.

The sign matrix can be represented by a matrix with $1, -1$ entries or mapped to an equivalent matrix with binary $1, 0$ entries, or other such equivalent representations.

Description of the Hamiltonian Cost Terms

As described elsewhere herein, the cost term M describes the cost involved in determining the change in utility for the two players involved in a given transition. The cost is reflected in the contribution to the energy of the quantum system. In one possible embodiment, herein described, the costs incurred by the terms in 'M' correspond to the costs incurred for reading an entry from the previously defined sign matrix. The costs and contribution to the energy of the quantum system when reading an entry from the sign matrix are incurred by the function herein described for mapping a numerical value to a binary vector.

To read an entry from the partitioned sign matrices, $S^+$, $S^-$, requires two steps:

1) Determine the current player state in G
2) Determine the column index of the sign matrix corresponding to the player state and edge operation (either addition or removal).

To encode in a QUBO, the matrix reading is achieved by matrix multiplication. In general, the entry $a_{ij}$ of a matrix A can be obtained via $$a_{ij} = \vec{i} \cdot A \cdot \vec{j}^T,$$

where $i$, $j$ are 'canonical basis vectors'.

The player state is a computed property and depends on graph G. To read an entry in the sign matrix it is therefore required to map the computed player state value to the correspond basis vector $j$ for the player state column in the sign matrix. The mapping of the numerical player state $\chi_p$ value to the vector $\vec{j}$ maybe determined by the function $\text{MAP}(\chi_p)$.

Definition 21: State Mapping Function. The state mapping function $\text{MAP}(\chi_p)$ maps the real value state number to a binary vector. $\text{MAP}(\chi_p) \rightarrow \vec{j}$; $\chi_p \in \mathfrak{R}$, $\vec{j} \in Z_2^n$.

The mapping function can be used to read an entry from the sign matrix for a given player state.

For example, the sign matrix has columns associated with the ordered set of player states $\chi_p \in \{\chi_0, \chi_1, \chi_2\}$ and three rows for three players. To read the entry corresponding to the first player in the $\chi_0$ state from the partitioned $S^+$ matrix we wish to read entry $S^+_{0,0}$ $$S^+_{0,0} = \vec{p} \cdot S^+ \cdot \vec{j}^T = [1, 0, 0] \cdot S^+ \cdot [1, 0, 0]^T.$$

where the function $\text{MAP}(\chi_0) \rightarrow \vec{j}$, and $\vec{p}$ is a basis vector corresponding to the player ordering.

The mapping function, $\text{MAP}(\chi_P)$, of a player state value, $\chi_p$, to a canonical basis vector, $\vec{j}$, can be achieved by a vector $\vec{j}$, satisfying minimisation constraints, $$\text{MAP}(\chi_P) \rightarrow \vec{j} \equiv \min_{\vec{j}} \left( \vec{j} \cdot \vec{z}^T - \chi_p \right)^2 + \lambda \left( \vec{j} \cdot \vec{j}^T - 1 \right)^2$$

where $\vec{z}$ is a vector of real values corresponding to the ordering of columns in the sign matrix, e.g. $\vec{z} = [\chi_0, \chi_1, \ldots, \chi_n]$, and $\lambda$ is a real coefficient.

The preceding constraint adds to the cost and increases the quantum system energy when: a) The position of the non-zero entry does not correctly correspond to the matching column position; b) the number of non-zero entries is not one. The cost is null when the mapping is correct and the constraints are met. These costs are associated with the set of terms 'M' in the Hamiltonian Eq 15.

For example, consider a set of player states given by the ordered set $\chi_p \in \{0, 1, 2, 3\}$. The mapping function $\text{MAP}(\chi_p)$ is defined by $\vec{z} = [0,1,2,3]$. The correct mapping of state $\chi_p = 0$ is given by $\vec{j} = [1,0,0,0]$ where the mapping cost is $$\text{MAP}(0) \rightarrow [1, 0, 0, 0] =$$

$$\left( [1, 0, 0, 0] \cdot [0, 1, 2, 3]^T - 0 \right)^2 + \lambda([1, 0, 0, 0] \cdot [1, 0, 0, 0] - 1)^2 = 0 + 0 = 0$$

For an incorrect mapping such as $\vec{j}=[0,1,0,0]$ the mapping cost is >0

$$MAP(0) \rightarrow [0, 1, 0, 0] =$$

$$([0, 1, 0, 0] \cdot [0, 1, 2, 3]^T - 0)^2 + \lambda([0, 1, 0, 0] \cdot [0, 1, 0, 0] - 1)^2 = 1 + 0 = 1.$$

As previously discussed elsewhere herein, the penalty terms Pr and Pa introduce a penalty for adding or removing a link when the action should not be taken. In other words, these terms penalize the addition or removal of a given link when it is not in the interest of any of the players involved in the decision (i.e. when it breaks the network formation rules for adding or removing the link). These terms can have a null (no penalty) or positive (a rule is broken) contribution to the total energy of the system.

The network formations rules corresponding to viable transitions when an edge is either added or removed from a graph G, can be given by a set of logical operations. For a given edge $e_i$ the validity of edge addition and removal, indicated respectively by binary variables $z_a^{\,i}$ and $z_r^{\,i}$, are determined by $$z_a^i = \mathrm{AND}\left(z_p^+, z_q^+\right)$$

$$z_r^i = \mathrm{OR}\left(z_p^{i-}, z_q^{i-}\right)$$

where $z_p^+$, $z_q^+$, $z_p^{\,i-}$, $z_q^{\,i-}$ are binary variables indicating the sign of the utility change for players p and q involved in the transition when the edge $e_i$ is either added or removed to G. Example methods for determination of $z_p^+$, $z_q^+$, $z_p^{\,i-}$, $z_q^{\,i-}$ are described elsewhere in this document and are associated with the cost terms 'M'.

The cost of determining the viable transitions are introduced into the cost function as penalty terms $P_a^{\,i}$ and $P_r^{\,i}$. These terms add to the cost and increase the quantum system energy when the validity of the edge addition and removal operations are incorrectly determined with respect to $z_p^+$, $z_q^+$, $z_p^{\,i-}$, $z_q^{\,i-}$. The quantum system energy increases when:

A transition associated with edge removal is beneficial for either player but the edge transition is indicated as a non-viable transition.

A transition associated with edge removal is not beneficial for either player but the edge transition is indicated as a viable transition.

A transition associated with edge addition is beneficial for both players but the edge transition is indicated as a non-viable transition.

A transition associated with edge addition is beneficial for either player but the edge transition is indicated as a viable transition.

A transition associated with edge addition is not beneficial for either player but the edge transition is indicated as a viable transition.

A possible realisation of the terms $P_a^{\,i}$ and $P_r^{\,i}$ are associated with the encoding of the logical AND and OR operations, whereby these terms are determined as $$P_a^i = h(z_1, z_2, z_a) = -2(z_1 + z_2)z_a + z_1 z_2 + 3z_a \qquad \text{[Eq 14]}$$

$$P_r^i = f(z_1, z_2, z_r) = -2(z_1 + z_2)z_r + z_1 z_2 + z_r + z_1 + z_2$$

such that:

$$P_r = f(z_1, z_2, z_r) = \begin{cases} z_r & \text{if } (z_1, z_2) = (0, 0) \\ 1 - z_r & \text{if } (z_1, z_2) = (1, 0) \text{ or } (z_1, z_2) = (0, 1) \\ 3(1 - z_r) & \text{if } (z_1, z_2) = (1, 1) \end{cases}$$

$$P_a = h(z_1, z_2, z_a) = \begin{cases} 3z_a & \text{if } (z_1, z_2) = (0, 0) \\ z_a & \text{if } (z_1, z_2) = (1, 0) \text{ or } (z_1, z_2) = (0, 1) \\ 1 - z_a & \text{if } (z_1, z_2) = (1, 1) \end{cases}$$

where $z_1$, $z_2$, $z_a$, $z_r$ are binary variables. In Eq.14, $z_r$ and $z_a$ are ancila variables that indicate whether the link under consideration is actually added ($z_a=1$) or removed ($z_r=1$). Therefore, these terms ensure that configurations that satisfy the link addition and removal rules ($z_r$ and $z_a$ are assigned correctly) have lower energies than those that break these rules (which are penalized with a positive contribution to the energy).

As described above, the method may include other cost-based terms such as the D term. The D term in the Hamiltonian presented in Eq. 13 counts the number of viable deviations from the state $G_i$ to any other adjacent graph and compares this to the target number of viable deviations. The cost and penalty terms in the Hamiltonian ensure that the players' interest is in accordance to the benefit they would obtain from a transition, and that the final decision respects the link addition and removal rules of the system. However, these terms do not quantify the number of outgoing viable deviations of the considered graph $G_{in}$. For this purpose, we introduce the term:

$$d^i = a\left(z_\pm^i, z_a^i\right) + b\left(z_\pm^i, z_r^i\right)$$

to count the viable transitions, where a( ) and b( ) are functions determined by a given realisation of the algorithm, and $z_\pm^i$, $z_a^i$, $z_r^i$ are binary variables. $z_a^i$, $z_r^i$ are binary variables indicating whether the transition for edge $e_i$ is viable with respect to the edge addition and removal from graph G; $z_\pm^i$ is a binary variable determining whether $e_i$ can be added or removed from G. An edge can only be removed if it exists in G and can only be added if it does not exist in G, whereby $$z_\pm^i = 1 - (e_i \cdot G),$$

and $z_\pm^i=1$ if the edge can be added to G and $z_\pm^i=0$ if the edge can be removed from G.

The cost terms applied to the quantum system associated with the terms $d^i$ are given by the terms $D^i$. Two possible realisations of $d^i$ using different a( ) and b( ) re:

$$d^i = (1 - z_\pm^i)z_r^i + z_\pm^i z_a^i \qquad \qquad 1)$$

$D^i=0$; No cost is associated with this operation.

$$d^i = \mathrm{AND}(z_\pm^i, z_a^i, z_{Da}) + \mathrm{AND}(z_\pm^i, z_r^i, z_{Dr}) \qquad 2)$$

$D^i = h(z_\pm^i, z_a^i, z_{Da}) + h(z_\pm^i, z_r^i, z_{Dr})$; The costs associated here are from the application of the logical gates.

The second realisation is preferred because the term $d^i$ remains first order and allows it to be more readily used proceeding calculations when considered under the setting of a QUBO.

The final term, $\hat{D}$, is added to ensure that the quantum system energy is increased when the total number of viable deviations is not equal to the total number of viable deviations $N_D$ allowed for the targeted states of interest $$\sum_i^E d^i < N_D.$$

One possible realisation is $$\hat{D} = \left(\left[\sum_i^E d^i\right] - N_D\right)^2.$$

The Hamiltonian introduced in Eq. 13 may ensure that the stable graph configuration $G_0$ has a very low energy compared to the rest of states. This graph is formally defined as the graph with the least viable number of outgoing deviations. For a correct reading of the sign matrix, the M term will always be M=0. A correct assignment of za and zr will ensure that Pr=Pa=0. Finally, we will have that D=0. Therefore, each non-viable deviation will give a null contribution to the energy of the quantum system. By construction, $G_0$ should always be at the lowest end of the energy spectrum. Similarly, this Hamiltonian may guarantee that states with one viable outgoing deviation have low energies. For the viable deviation, the contribution of each term to the Hamiltonian is now C=0, Pr=$P_a$=0 and D=1.

A classical algorithm that can be written to count the number of one-link valid deviations for a given graph G. Given that G can be represented by a binary vector of edges, the problem may be formed as a Quadratic Unconstrained Binary Optimisation (QUBO). This algorithm (see example Algorithm 1 underneath) may be expressed by a set of linear operations acting on the binary variables G. To do this, require some building blocks as exemplified and described underneath. An example of an algorithm for counting valid deviations is shown below:

1: count=0
2: for b∈B do
3: if b∈G then
4: $\hat{G}$=G−b. Remove the edge to find adjacent graph.
5: else
6: $\hat{G}$=G+b. Add the edge to find adjacent graph.
7: end if
8: Change in utilities for players p and q connected by b
9: $\Delta u_p = u_{\hat{G},p} - u_{G,p}$
10: $\Delta u_q = u_{\hat{G},q} - u_{G,q}$
11: if b∈G then
12: if $\Delta u_p > 0$ and $\Delta u_q > 0$ then
13: count+=1
14: end if
15: else
16: if $\Delta u_p > 0$ or $\Delta u_q > 0$ then
17: count+=1
18: end if
19: end if
20: end for We now look at the QUBO formulation. From the provided preceding descriptions one possible embodiment of the algorithm may be achieved with the steps (although other QUBO formulations are possible):

1) Construct the delta and sign matrices for the players utility and state functions.
2) For a graph G given in vector format:
   a) For all players determine the player state in G.
   b) For all players read in the state transition signs from the sign matrix.
   c) For all edge basis vectors, et, spanning the space of all possible G
      i) Determine players involved in edge e;
      ii) Determine if the edge exists in G.
      iii) Determine player utility change signs.
      iiii) Determine if edge addition and removal are viable transitions with respect to the network formation rules.
      iiiii) Add to the cost term if the edge operation is viable.
3) Count the total viable transitions and compare to the target number of allowed viable transitions.

Algorithm 1 provides one such possible embodiment of the protocol described above, where the cost terms of the algorithm are associated with the previously described embodiments of the terms M, $P_r$, $P_a$, D and $\hat{D}$.

The complexity of the method outlined in Algorithm 1 comprises of two parts, the computational complexity to construct the problem as a QUBO, and the resource complexity for implementing the QUBO on a quantum device. The computational complexity can be separated into:

1) Complexity to construct the sign matrix.
2) Complexity to construct the QUBO coefficients.

The complexity to construct the sign matrix is $O(N|\chi|)$ where $|\chi|$ is the maximum number of possible player states for a given problem and N is the plurality of players.

For example, consider the player states given by the player cardinality |P| in a graph, where $|\chi|=N$. Therefore the classical complexity to construct the sign matrix is $O(N^2)$, compared to the classical algorithm to construct the adjacency matrix which scales super-exponentially as $O(N^{N^2})$.

For one such possible realisation of the method, for example in Algorithm 1, the number binary variables required is given by $$N_Q = N|\chi| + 4E < N|\chi| + 4N(N-1) < N|\chi| + 4N^2$$

where $N_Q$ is the number of binary variables, synonymous to the number of quantum resources, required. When $N|\chi| \leq N^2$ then this scales as $O(N^2)$, otherwise the scaling is as $O(N|\chi|)$.

For both computational and resource complexity which are bounded by $O(N|\chi|)$ there exists many possible sets of player states where $O(N|\chi|) < O(N^{N^2})$ and can achieve up to a super-exponential benefit over classical adjacency based methods in both cases of complexity.

Algorithm 1: Algorithm for creating the graph sampling QUBO.

Input : Sign matrix S
Output: Total cost
set g; Set the candidate graph vector.
$z^+ := [\ ]$ , $z^- := [\ ]$ d := [ ]; Set arrays.
for player ∈ P do
| MAP($(g|f_p)$) → $|f_p(g))$ map player state to canonical
| $z_p^+ := (p|S^+|f_p(g))$
| $z_p^- := (p|S^-|f_p(g))$
end
for $e_m \in \varepsilon$ do
| $z^\pm = 1 - (g|c_m)$; Determine if edge is added or removed
| $z_a^m :=$ AND($z_p^+$, $z_q^+$)
| $z_r^m :=$ OR($z_p^-$, $z_q^-$)
| $d^m :=$ AND($z_a^m$, $z^\pm$) + AND($z_r^m$, $z^\pm$)
end
$C = (\Sigma_m^M d^m - D)^2$ Detecting Cycles The previously described methods herein are used to identify states of interest in the supernetwork with specific numbers of outgoing deviations. Herein the previously described methods are referred to as state-detection. The state-detection can be integrated into a further framework for detecting cycles, where valid cycles are determined by low energies of a quantum system. The size of the cycle, given by the number of participating graph states is denoted by $N_C$.

A cost term for detecting cycles can be made up of sets of cost terms, '$H_s$', '$P_C$' and '$P_D$', consisting of one or more contributions to the quantum system energy.

The first set of terms '$H_s$ are associated with the costs, as herein previously described, for the methods of state-detection for states of interest. States of interest for cycles of size $N_C$ are states where there are one or more outgoing transitions. For example, when $N_C<6$ states of interest are only those involving one outgoing transition, when $12>N_C>5$ states of interest are those with one or two outgoing transitions.

The second set of terms $P_C$ are associated with the costs in constructing the topology of a cycle. The topology of a cycle is determined by the edge transitions between adjacent graphs involved in the cycle. The set of terms $P_C$ increase the quantum system energy when the topology of a cycle is violated. For example, in a sequence of graphs they must all be adjacent, herein defined as differing by only one edge basis, to the preceding and proceeding graphs in the sequence; $P_C$ adds a positive contribution to the system energy when any graphs involved in this sequence violate the adjacency condition.

The third set of terms $P_D$ are associated with the costs when validating the topology of the cycle. For a cycle to have a valid topology the edges of a graph that allow for a viable transition must be the same as the set of edges that define topology of the cycle. For example, in a sequence of graphs they must all be adjacent, in addition to the previously described terms for $P_C$ for defining the topology of a cycle, the adjacent graphs can only be adjacent by edges involved in viable deviations. More concretely, if graph $G_0$ is adjacent to $G_1$ in a given cycle topology then the edge involved in the viable deviation of $G_0$ must be $G_0$–$G_1$. When the viable deviation of a graph is not correctly associated with the adjacency topology of a cycle a positive contribution will be added to the quantum system energy.

Example Cycle Detection

One such example of the costs associated with detecting a cycle is herein given but not limited to. For a given example the cycle of interest involves four graph states; by Theorem 1 it is known that each of these graphs involved in the cycle must have only one outgoing deviation.

The costs associated with 'D' in this case are four independent implementations of the previously described state-detection algorithm where the states of interest are each with one outgoing deviation. For four valid states the costs associated with 'D' will be null.

The costs associated with $P_C$ are given by the conditions between adjacent graphs in the cycle. The topology of the example cycle is defined by the adjacency sequence $G_0 \rightarrow G_1 \rightarrow G_2 \rightarrow G_3 \rightarrow G_0$. However, in other cases the adjacency sequence may be more complex when involving chordal cycles. The costs associated with each adjacent pair of graphs $G_x \rightarrow G_y$ are given by $$P_C^{xy} = ([G_x - G_y] \cdot \underline{1} - 1)^2,$$

where $\underline{1}$ is a vector of all unit entries and
$P_C^{xy} = 0$ if $G_x$, $G_y$ are adjacent i.e. different by only one edge
>0 otherwise.

The quantum system energy will be increased if the topology of the cycle is not met, otherwise there will be a null contribution for all allowed topologies.

The costs associated with $P_D$ validate the previously given cycle topology with respect to the edges giving arise to viable transitions in the state-detection costs. Considering the example above for the adjacency sequence $G_0 \rightarrow G_1 \rightarrow G_2 \rightarrow G_3 \rightarrow G_0$, in this example for this sequence to valid with adjacent graphs it must be true that $G_0$–$G_1$=–$(G_2$–$G_3)$ and $G_1$–$G_2$=–$(G_3$–$G_0)$. Therefore $G_0$ and $G_2$ must have viable transitions with the same edge however one transition must be with respect to the edge addition and the other with respect to the edge removal, which gives arise to no net change and thus allows for the cycle. The same argument can be applied to $G_1$ and $G_3$. In the state-detection algorithm the viable edge transitions for edge e; were given by the term $d^i$. The costs given by $P_D$ ensure that the terms $d_x^i$ and $d_y^i$ are the same and meet the previously given conditions for a valid cycle. For E possible edges let $\underline{d}_x = [d_x^0, d_x^1, \ldots, d_x^E]$, and $\underline{z} = [0, 1, \ldots, E]$, then the cost of matching deviations between graphs $G_x$ and $G_y$ are given by $$P_D^{xy} = (\underline{d}_x \cdot \underline{z} - \underline{d}_y \cdot \underline{z})^2,$$

where $$P_D^{xy} = 0 \text{ if } \underline{d}_x = \underline{d}_y,$$

>0 otherwise.

Applied to the previously stated example where the pairs of graph $G_0$, $G_2$ and $G_1$, $G_3$ must have the same outgoing edge transition $$P_D = (\underline{d}_0 \cdot \underline{z} - \underline{d}_2 \cdot \underline{z})^2 + (\underline{d}_1 \cdot \underline{z} - \underline{d}_3 \cdot \underline{z})^2.$$

The final Hamiltonian for cycle detection takes on the form of $$H = \sum_n^{N_c} H_s(N_d) + \sum_{\{x,y\}} P_C^{xy} + \sum_{\{v,u\}} P_D^{vu}$$

where $H_s(N_d)$ is the hamiltonian for state-detection, as previously defined herein, for finding a state with $N_d$ viable transitions; and where {x, y} and {v, u} define the sets of pairs of graphs defined by the target cycle topology. Depending of the realization of the topology of the cycle the pairs of graphs in {x, y} and {v, u} contributing in the terms will vary. The quantum system energy will be 0 when all previously defined costs are 0 which implies that all conditions on the topology of the cycle and state-detection were met.

Example Quantum Annealer

As described above, the above methods may be applied to (i.e. run by) a quantum computer. This quantum computer may be a Universal quantum computer, such as a gate quantum computer, whereby the quantum computer has the ability to control and manipulate the evolution of the states of the quantum system over time. Such Universal quantum computers may be based on different technologies such as, but not limited to: linear optical quantum computers wherein qubits are provided by different modes of light; trapped ion quantum computers and neutral atom quantum computers where qubits are encoded in hyperfine ground states. Another type of quantum computer for use with the method described herein are analog quantum computers.

As described above, examples described herein describe methods suitable for running on a quantum annealer, although other quantum computers may also be used. There now follows details of an example of a quantum annealer for executing such methods. It is to be understood that other quantum annealing systems may also be used and that features and configurations of the following quantum annealer may be adapted by having steps or features added to the annealer, removed from the annealer, replaced, re-ordered or re-configured. Furthermore, any quantum annealing features, steps or configurations described elsewhere herein may be used with the following quantum annealer. Correspondingly, any of the features, configurations and steps of the following quantum annealer may be used with any other description of a quantum annealer described herein.

Quantum Annealing Process

We assume that the qubits in this example of operation are flux qubits, an example of which is described below, however other types of qubits may also be used. A single qubit, taking states of 0 or 1 is encoded by circulating currents in a loop that correspondingly produce magnetic fields. A current circulating in one direction has a magnetic field through the loop in a first direction whilst current in another direction has a magnetic field through the loop in a second direction that is opposite the first direction.

As described above for FIG. 1, and depicted in Figure Sa, each qubit starts off in a superposition state 1104 that manifests a single lowest energy state of the qubit. This superposition state 1104 is generated by the quantum computer imparting an external magnetic field (1105) perpendicular or approximately at right angles to the magnetic fields of the qubit states of '0' and '1'. This single state may be thought of as a starting single well potential (1102).

The anneal progresses by slowly reducing the strength of external perpendicular magnetic field whilst slowly increasing the inputs to the qubits and their couplers, as described underneath and elsewhere herein. The inputs to the qubits and their couplers setting the conditions that the annealer is to solve.

One the anneal has finished, the classical states of the qubits of the quantum system are read by the quantum computer.

Figures 5A, 5B:
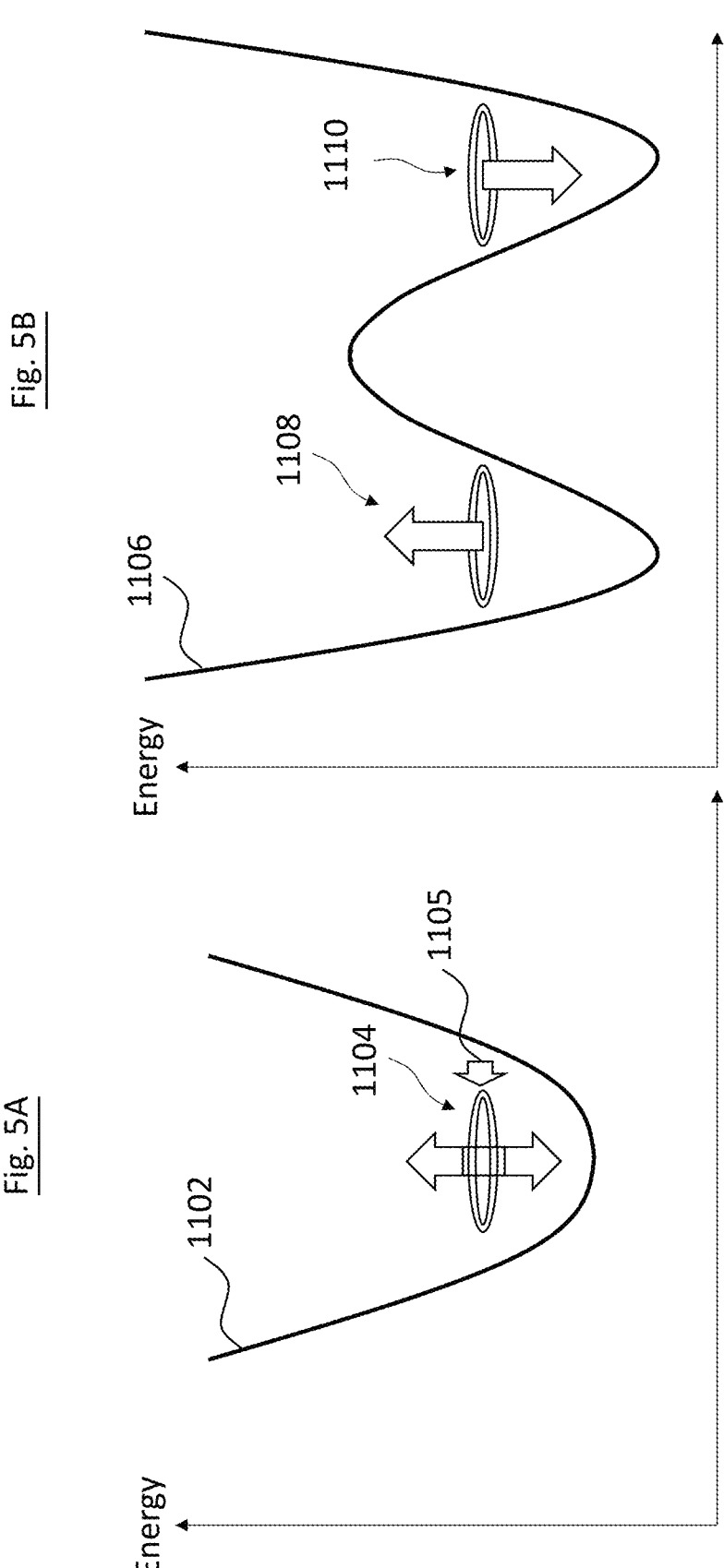
FIGS. 5a and 5b show examples of single and double well potentials, respectively, for a flux qubit.

As the anneal progresses, from the superposition state 1104 to the final annealed state, a qubit tends to either its '1' or its '0' classical state. Each of these annealed final states manifests its own energy level that may be the same or different to the other. Without external influence, a nominal qubit annealing from a superposition state would have both 0 and 1 states anneal with the same lowest energy, hence both the '0' and '1' state would nominally have equal probability in a double well potential 1106 as shown in FIG. 5b. By applying one more external influences to the qubit, the quantum computer can change the quantum system such that one of the annealed '0' or '1' states has a lower energy than the other. If the anneal is performed in an adiabatic manner in such a single qubit system, the quantum system has a high likelihood of having a final resulting 'annealed' state at the lowest energy.

External influences that can affect the quantum system and thus control the energy levels of the double well include an externally applied magnetic field. Another term for the externally applied magnetic field is a 'bias'.

Couplers define how qubits influence each other and rely on quantum entanglement. Take for example two qubits A and B. Each qubit may take the final annealed state of 0 or 1. Couplers may be 'same state' couplers wherein the coupler acts to make the coupled qubits the same state, i.e. state '0' for qubit A and state '0' for qubit B; or state '1' for qubit A and state '1' for qubit B. Couplers may be 'opposite state' couplers wherein the coupler acts to make the coupled qubits the opposite state, i.e. state '0' for qubit A and state '1' for qubit B; or state '1' for qubit A and state '0' for qubit B. A coupler effectively acts to lower the energy of those two states. For example, in a 2-qubit system there are 4 sets of states [00], [01], [10], [11]. The energies of these states come about from the biases on the qubit and the coupler linking them. The strength of the bias and its direction can be chosen by programming the system.

Choosing the biases and couplings creates an energy landscape, as referred to in FIG. 1, that is unknown at the start but that the annealing attempts to find the minimum energy level of.

Programming

The annealer may be programmed in accordance with a Hamiltonian operator representing the quantum system and the inputs provided to it. The Hamiltonian operator of a quantum annealer tells you the energy of the system given the initial system setup and comprises a first part (the initial or tunnelling Hamiltonian) and a second part (the final or problem Hamiltonian).

The first part of the Hamiltonian is used when the quantum system is in superposition 1104, i.e. a quantum state, as shown in FIG. 5a. Thus when applying a superposition state 1104 to the whole Hamiltonian operator, the initial part of the Hamiltonian will provide the answer to the energy level of the quantum system. As the qubits move away from a superposition state 1104 towards a final annealed 'classical' state, for example state 1108 or 1110 as shown for a simple single qubit quantum system in FIG. 5b, the initial portion of the Hamiltonian operator slowly loses dominance in representing the output energy level to eventually, at a point of full annealing, where the final states of each qubit is known, the final Hamiltonian on its own is the part of the operator that determines the energy state of the system. The final Hamiltonian utilises the biases and couplings chosen to map the energy landscape, thus defining the problem that needs solving. The final part of the Hamiltonian may be represented by a QUBO (Quadratic Unconstrained Binary Optimization) function as shown in the equation below wherein $a_i$ represents the bias signals provided to qubit $q_i$; and $b_i$ represents the signals provided to the coupler coupling qubits $q_i$ and $q_j$.

$$E_{qubo}\left(a_i,\, b_{i,j}; q_i\right) = \sum_i a_i q_i + \sum_{i<j} b_{i,j} q_i q_j.$$

The QUBO formulation may take the form of a QUBO Matrix, the values of which are derived from defining the problem to be solved and used to drive the quantum annealer. Alternative models such as the Ising model may also be used to represent the Hamiltonian of the quantum system.

When the Hamiltonian operator is applied to the system where each qubit is in the superposition state, the system is in its lowest energy state. As the anneal progresses the quantum system is trying to keep the system in this lowest state. If the anneal happens too quickly there is a chance that the quantum system jumps to another higher (undesired) energy state. When the annealing process is adiabatic enough, the quantum annealer should stay in its lowest energy state as it transitions to energy level solutions represented by the initial Hamiltonian to the energy level solutions represented by the final Hamiltonian.

Qubits

The qubits of the annealer may be formed from different technologies including charge qubits and flux qubits, however the following describes flux qubits made from loops of superconducting material. In some examples of superconducting flux qubits, the loops may be made from aluminium which has an energy gap corresponding to a frequency of 90 GHz at a temperature of 20 mK. This gap is an order of magnitude greater than the typical energy difference between the two levels in a superconducting qubit. This allows the system to control the qubit without breaking up the Cooper pairs and jeopardizing the quantum coherence of the system.

Set within the loops are Josephson junctions that typically comprise a thin layer of aluminium oxide, which is an insulator, sandwiched between two superconducting layers of aluminium, which becomes a superconductor when cooled below 1.2 K. The insulating layer is very thin (for example a few nanometres) such that Cooper pairs can tunnel through it and couple the superconducting wavefunctions on either side of the barrier.

One example of a quantum annealer qubit is niobium-based superconducting flux qubit loops operating at mil-likelvin temperatures. Such qubits devices may also be termed a SQUID (Superconducting Quantum Interference Device). The couplers between such qubits may also comprise superconducting loops.

The flux qubits of superconducting current are interrupted by Josephson tunnel junctions where a superconducting phase difference exists across the qubit's Josephson junctions. These qubits conform to the artificial Ising spin model having |up> and |down> states corresponding to current circulating either clockwise or counter-clockwise around these loops. The superconducting phase difference across the qubit's Josephson junctions is related to the flux threading the qubit loop and acts as a quantum degree of freedom residing in the qubits double-well potential energy in the energy landscape. From an energy landscape perspective, the |up> 1108 and |down> 1110 states correspond to the phase being localized in the left or right wells of the double potential 1106.

Figure 6:
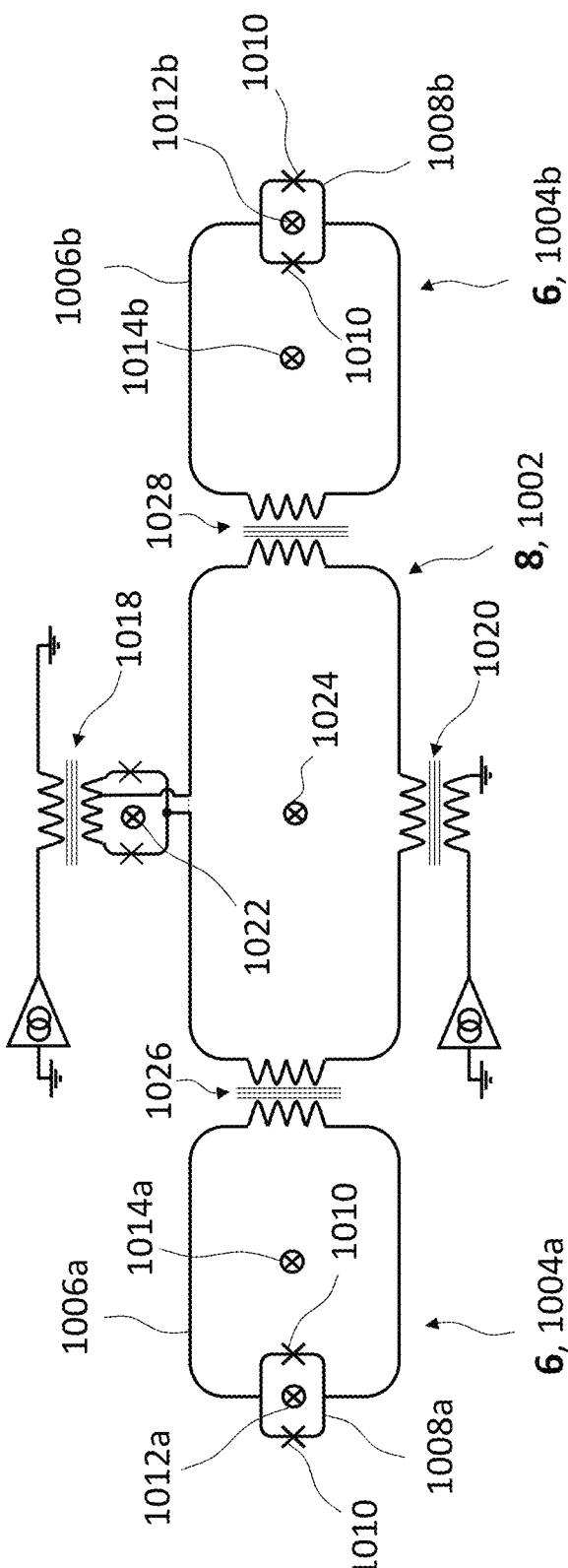
FIG. 6 shows an example of quantum computer hardware, for use with the method, having a coupler coupling two flux qubits.

The height of the barrier in the double-well potential 1106 is controlled by the flux 1012a through a secondary loop 1008a of the qubit, for example see FIG. 6. The local field coefficients in the problem Hamiltonian are controlled by flux 1014a threading the main qubit loop 1006a which induces an energy offset between the left and right wells of the double well potential 1106, arising from the magnetic field energy stored in the qubit's inductive loop.

The couplers, for example item 1002 in FIG. 6, are sign and magnitude tuneable and provide coupling between these artificial spins of the qubits. Couplers may be flux-tuneable superconducting rf-SQUID transformers acting as effective mutual inductances, coupling flux from the loop of one flux qubit to the loop of another.

Example of Coupled Qubits

FIG. 6 shows an example of a coupler 1002 coupling two superconducting flux qubits 1004a/b wherein each qubit comprises Josephson junctions. The coupler 1002 and qubits 1004a are also labelled 8 and 6 respectively to show relevance to FIG. 1. In each qubit 1004a/b in FIG. 6, a main loop of superconducting wire 1006a/b of inductance Lq is interrupted by a smaller loop 1008a/b of inductance Lcjj with two Josephson junctions 1010. The smaller loops are subjected to external magnetic flux 1012a/b whilst main loops 1006a/b are subject to external magnetic flux 1014a/b.

The coupler 1002 is controlled via bias currents that are coupled to the coupler 1002 through mutual inductances 1018 and 1020. These mutual inductances 1018 and 1020 in turn give rise to the fluxes 1022 and 1024 respectively. The qubits interact with the coupler via mutual inductances 1026 and 1028.

Examples of Features of a Classical Computer/Computing System for Use with the Method Some portions of the above description present the features of the method/system in terms of algorithms and symbolic representations of operations on information performed by a classical computer. These algorithmic descriptions and representations are the means used by those skilled in the data processing arts to most effectively convey the substance of their work to others skilled in the art. These operations, while described functionally or logically, are understood to be implemented by computer programs. Furthermore, the reference to these arrangements of operations in terms of modules should not be considered to imply a structural limitation and references to functional names is by way of illustration and does not infer a loss of generality.

Unless specifically stated otherwise as apparent from the description above, it is appreciated that throughout the description, discussions utilising terms such as "processing" or "identifying" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the method or system include process steps and instructions described herein in the form of an algorithm. It should be understood that the process steps, instructions, of the said method/system as described and claimed, may be executed by computer hardware operating under program control, and not mental steps performed by a human. Similarly, all of the types of data described and claimed may be stored in a computer readable storage medium operated by a computer system, and are not simply disembodied abstract ideas.

The method/system also relates to an apparatus for performing the operations herein. This apparatus may be specially constructed for the required purposes, or it may comprise a general-purpose computer selectively activated or reconfigured by a computer program stored on a computer readable medium that can be executed by the computer. Such a computer program is stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Any controller(s) referred to above may take any suitable form. For instance, the controller(s) may comprise processing circuitry, including the one or more processors, and the memory devices comprising a single memory unit or a plurality of memory units. The memory devices may store computer program instructions that, when loaded into processing circuitry, control the operation of the route provider and/or route requester. The computer program instructions may provide the logic and routines that enable the apparatus to perform the functionality described above. The computer program instructions may arrive at the apparatus via an electromagnetic carrier signal or be copied from a physical entity such as a computer program product, a non-volatile electronic memory device (e.g. flash memory) or a record medium such as a CD-ROM or DVD. Typically, the processor(s) of the controller(s) may be coupled to both volatile memory and non-volatile memory. The computer program is stored in the non-volatile memory and may be executed by the processor(s) using the volatile memory for temporary storage of data or data and instructions. Examples of volatile memory include RAM, DRAM, SDRAM etc. Examples of non-volatile memory include ROM, PROM, EEPROM, flash memory, optical storage, magnetic storage, etc. The terms 'memory', 'memory medium' and 'storage medium' when used in this specification are intended to relate primarily to memory comprising both non-volatile memory and volatile memory unless the context implies otherwise, although the terms may also cover one or more volatile memories only, one or more non-volatile memories only, or one or more volatile memories and one or more non-volatile memories.

The algorithms and operations presented herein can be executed by any type or brand of computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the method/system is not described with reference to any particular programming language. It is appreciated that a variety of programming languages may be used to implement the teachings of the invention as described herein.

The invention claimed is:

1. A method of driving a quantum computer to find one or more states of interest of a network, the quantum computer comprising a quantum system; the network comprising a plurality of players wherein:
   a set of different configurations for the network are represented by a set of a plurality of graphs;
   each player is associated with a different vertex in a set of vertices for the plurality of graphs;
   each of the one or more states of interest respectively corresponds to one of the graphs;

each graph comprises:
   i. the plurality of players; and
   ii. a set of connections representing edges between the vertices, wherein: each connection connects two vertices;
   iii. a different set of connections to any of the other graphs in the set of graphs;
for each graph, a corresponding set of utilities defines a net payoff between the players having a connection in the respective graph;
the method comprising using a processor to:
I) determine a set of adjacent graphs by determining, for each graph, whether each of the other graphs are adjacent by:
defining another graph to be adjacent if the connections between the two graphs differ by one;
II) define a cost function associated with a Hamiltonian operator of the quantum computer; the cost function comprising a set of parameters determined by analysing the utilities of the vertices in the set of adjacent graphs wherein:
   A. a transition between adjacent graphs is determined as viable or non-viable wherein a viable transition occurs if:
   iv. a connection is added between the vertices and:
      1. the utility of at least one of the said vertices is increased; and
      2. the utility of the other of the said vertices is increased or remains the same;
      or
   v. a connection is removed between the vertices and:
      1. the utility of one of the said vertices is increased;
   B viable transitions between adjacent graphs increase the energy of the quantum system;
   C. non-viable transitions between adjacent graphs lower the energy of the quantum system,
the method further comprising:
III) outputting a plurality of control signals for driving the quantum computer; the control signals associated with the set of parameters and comprising:
   one or more control signals for controlling the states of qubits in the quantum computer; and,
   one or more control signals for controlling the entanglement of qubits in the quantum computer;
   the method further comprising running the quantum computer using the control signals.

2. The method of claim 1 wherein the step of determining a set of adjacent graphs comprises deterministically constructing adjacent graphs using the definition of adjacency in claim 1, and as such appropriately adding or removing an edge from a graph.

3. The method of claim 2 wherein the determining of adjacent graphs is used to determine player information; the player information comprising:
   i) a set of numerical values for each player, each numerical value associated with one of a plurality of player states, each player state being associated with a graph, f(G, P), where G is the graph and P is the player;
   ii) an adjacency between player states based on a graph adjacency.

4. The method of claim 3 wherein the player information is stored in a binary matrix.

5. The method of claim 4 wherein the cost function comprises a quadratic unconstrained binary optimisation cost function, QUBO.

6. A method as claimed in claim 5, wherein the QUBO is a first QUBO, the method further comprising determining cycles of states in a supernetwork by forming a second QUBO from summing terms in the first QUBO associated with increasing the quantum system energy according to a cycle topology.

7. The method as claimed in claim 5 wherein at least one of the parameters comprising a cost of making a transition between two adjacent graphs; wherein determining the cost of making a transition comprises:

determining, for each of the players, the player state;
 determining, for each of the players between the two graphs, the change in utility;
 determining whether each change in utility is positive or negative.

8. The method as claimed in claim 7 wherein determining whether each change in utility is positive or negative comprises:

reading an entry from the binary matrix with respect to the player state; and
 determining, from the read entry, that the transition between the two adjacent graphs is viable or non-viable.

9. The method as claimed in claim 8 wherein reading the entry comprises matrix multiplying the binary matrix with canonical basis vectors.

10. The method as claimed in claim 8 further comprising, for the two players associated with a viable transition:

determining a player state column index and player state row index of the binary matrix for the respective read entry associated with that player.

11. The method as claimed in claim 10, wherein the canonical basis vectors are:

a) predetermined; or,
 b) determined by mapping a player state to a canonical basis vector.

12. The method as claimed in claim 1 wherein the set of parameters comprises a set of terms that increase the energy of the quantum system for any one or more of the following:

a transition associated with edge removal is beneficial for either player but the edge transition is determined as a non-viable transition;
 a transition associated with edge removal is not beneficial for either player but the edge transition is determined as a viable transition;

a transition associated with edge addition is beneficial for both players but the edge transition is determined as a non-viable transition;
 a transition associated with edge addition is beneficial for either player but the edge transition is determined as a viable transition;
 a transition associated with edge addition is not beneficial for either player but the edge transition is determined as a viable transition.

13. The method as claimed in claim 1 wherein the set of parameters comprises:

a. a first set of terms which represent counts of the number of viable transitions from each graph to any other adjacent graph; wherein each of the terms in the set increases the energy of the quantum system when any of:

a transition is determined as a viable edge addition, but the edge is being removed;
  a transition is determined as a viable edge removal, but the edge is being added;

b. a second set of terms which increase the energy of the quantum system for graph states with a number of viable transitions that is different from the predetermined number of viable transitions of the graph states of interest.

14. A method as claimed in claim 1 further comprising:

populating a QUBO matrix with data associated with the set of parameters;

deriving the control signals from the QUBO matrix.

15. A method as claimed in claim 1 wherein the quantum computer comprises a quantum annealer.

16. An apparatus comprising a computer system comprising the processor for running the method as described in claim 1.

17. The apparatus as claimed in claim 16 further comprising the quantum computer.

18. The apparatus as claimed in claim 17 wherein the quantum computer comprises a quantum annealer.

19. A computer readable medium comprising program code that, when run, gives effect to the method of claim 1.

* * * * *